United States Patent
Diller et al.

(10) Patent No.: US 12,407,276 B2
(45) Date of Patent: Sep. 2, 2025

(54) ROTARY ELECTROADHESIVE CLUTCH

(71) Applicant: ESTAT Actuation, Inc., Pittsburgh, PA (US)

(72) Inventors: Stuart B. Diller, Pittsburgh, PA (US); Kirby A. Witte, Pittsburgh, PA (US); John D. Watkins, Pittsburgh, PA (US); Carmel Majidi, Pittsburgh, PA (US); Brock Zekany, Pittsburgh, PA (US)

(73) Assignee: ESTAT Actuation, Inc., Pittsburgh, PA (US)

( * ) Notice: Subject to any disclaimer, the term of this patent is extended or adjusted under 35 U.S.C. 154(b) by 0 days.

(21) Appl. No.: 18/288,960

(22) PCT Filed: May 2, 2022

(86) PCT No.: PCT/US2022/027355
§ 371 (c)(1),
(2) Date: Oct. 30, 2023

(87) PCT Pub. No.: WO2022/232707
PCT Pub. Date: Nov. 3, 2022

(65) Prior Publication Data
US 2024/0213892 A1 Jun. 27, 2024

Related U.S. Application Data

(60) Provisional application No. 63/182,681, filed on Apr. 30, 2021.

(51) Int. Cl.
*F16D 28/00* (2006.01)
*H02N 13/00* (2006.01)

(52) U.S. Cl.
CPC .............. *H02N 13/00* (2013.01); *F16D 28/00* (2013.01)

(58) Field of Classification Search
CPC ................................. H02N 13/00; F16D 28/00
See application file for complete search history.

(56) References Cited

U.S. PATENT DOCUMENTS

| | | | |
|---|---|---|---|
| 2,850,907 | A | 9/1958 | Foster |
| 2,897,934 | A | 8/1959 | Fitch |

(Continued)

FOREIGN PATENT DOCUMENTS

| | | |
|---|---|---|
| IN | 202041052409 | 11/2020 |
| IN | 202041052409 A | 12/2020 |

(Continued)

OTHER PUBLICATIONS

International Search Report and Written Opinion of the International Searching Authority for PCT Application PCT/US2022/027355 dated Jul. 29, 2022.

(Continued)

*Primary Examiner* — Jacob S. Scott
*Assistant Examiner* — Farhana Pervin
(74) *Attorney, Agent, or Firm* — Michael G. Monyok

(57) ABSTRACT

An electroadhesive clutch using a ceramic-based dielectric layer separating opposing clutch plates, which function as electrodes. At least one of the clutch plates can be a flexible material, such as a thin film. A voltage applied across the electrodes creates an electrostatic attraction between the electrodes. The ceramic-based dielectric layer can be applied to one or both electrodes or, alternatively, placed between opposing electrodes. The ceramic-based dielectric reduces the voltage required to adhere adjacent plates, while also improving the force of adhesion. A rotary electroadhesive clutch using the ceramic-based dielectric provides improved force of adhesion and can be used to control the amount of torque transferred from an input to an output.

19 Claims, 21 Drawing Sheets

(56) References Cited

U.S. PATENT DOCUMENTS

| | | | |
|---|---|---|---|
| 3,002,596 A | 10/1961 | Fitch | |
| 3,343,636 A | 9/1967 | Donelan et al. | |
| 3,356,195 A | 12/1967 | Hale et al. | |
| 3,871,944 A | 3/1975 | Dominguez-Burguette | |
| 4,393,967 A | 7/1983 | Cuomo et al. | |
| 5,508,327 A * | 4/1996 | Cipriano | H02N 13/00 523/427 |
| 5,620,071 A | 4/1997 | Ishikawa et al. | |
| 6,564,916 B1 * | 5/2003 | Suzuki | F16D 25/0638 192/84.1 |
| 9,018,078 B2 * | 4/2015 | Sklenard | H01L 21/8221 438/455 |
| 9,272,427 B2 | 3/2016 | Garcia et al. | |
| 10,138,953 B1 | 11/2018 | Koenig et al. | |
| 10,663,016 B2 | 5/2020 | Schmitz et al. | |
| 10,711,848 B2 | 7/2020 | Koenig et al. | |
| 10,852,825 B2 | 12/2020 | Yoon et al. | |
| 10,998,835 B2 | 5/2021 | Majidi et al. | |
| 11,023,047 B2 | 6/2021 | Holbery et al. | |
| 11,036,295 B2 | 6/2021 | Moessinger et al. | |
| 2011/0140266 A1 * | 6/2011 | Matsuo | G06F 3/0446 257/735 |
| 2017/0222576 A1 * | 8/2017 | Majidi | F16D 27/00 |
| 2018/0163796 A1 | 6/2018 | Eckerle et al. | |
| 2019/0107157 A1 | 4/2019 | Schmitz et al. | |
| 2019/0339773 A1 * | 11/2019 | Holbery | G06F 3/016 |
| 2021/0004060 A1 | 1/2021 | Remaley et al. | |
| 2021/0271326 A1 | 9/2021 | Hinchet et al. | |
| 2022/0190749 A1 * | 6/2022 | Onuma | H01L 21/6831 |

FOREIGN PATENT DOCUMENTS

| | | |
|---|---|---|
| JP | H09-37579 | 2/1997 |
| JP | 2016-48089 | 4/2016 |
| WO | 2016057963 A1 | 4/2016 |

OTHER PUBLICATIONS

European Search Report for European Application EP 22796933.4 dated Feb. 18, 2025.

* cited by examiner

FIG. 4A
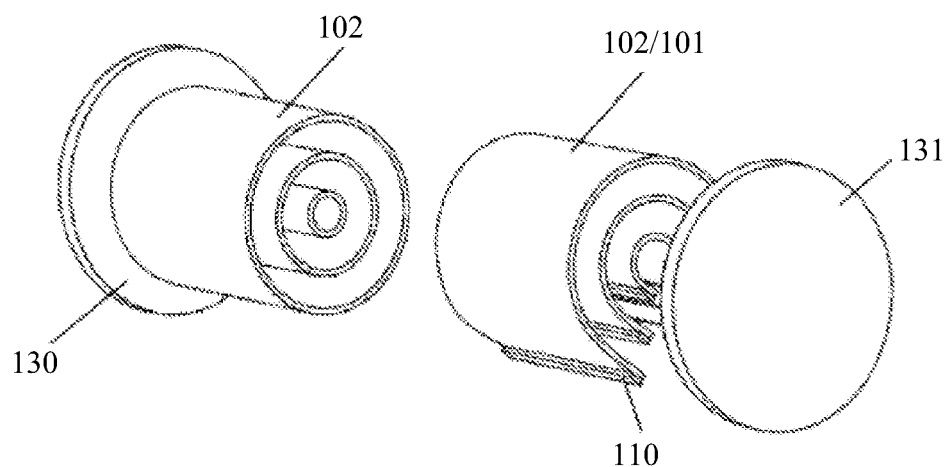
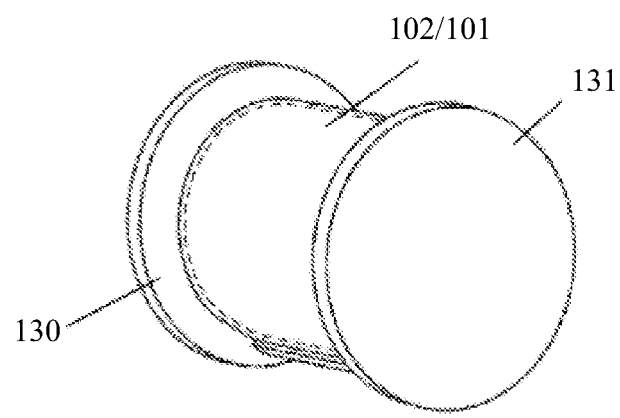
FIG. 4B

ROTARY ELECTROADHESIVE CLUTCH

CROSS-REFERENCE TO RELATED APPLICATIONS

This application claims the benefit under 35 U.S.C. § 119 of U.S. Provisional Application Ser. No. 63/182,681, filed Apr. 30, 2021, which is incorporated herein by reference.

STATEMENT REGARDING FEDERALLY SPONSORED RESEARCH

This invention was made with government support under SBIR number 1941405 awarded by the National Science Foundation. The government has certain rights in the invention.

BACKGROUND OF THE INVENTION

The invention relates generally to an electroadhesive clutch, and more particularly to an electroadhesive clutch that uses a ceramic-based dielectric to separate adjacent clutch plates, and to a rotary clutch design employing a plurality of clutch plates with at least one set of flexible plates.

Electroadhesive clutches use electrically conductive clutch plates that are separated by a dielectric material. When a voltage is applied across opposing clutch plates, where the plates are acting as electrodes, an electrostatic charge develops between the plates, creating an attractive state and causing the plates to adhere. With the plates adhered to each other, a force can be transmitted from one plate to the other. For example, a torque applied to one plate will transmit the torque to the opposing plate. Electroadhesive clutches can be created in various shapes, including rotary, stacked rotary, and linear, among others.

While existing electroadhesive clutches demonstrate the ability to transmit forces, the amount of force transmitted is limited by the force of adhesion between the plates. The dielectric material used to separate the plates affects the force of adhesion in addition to the responsiveness of the clutch and residual adhesion or hysteresis. Prior clutches use polymer or ceramic particle-embedded polymer dielectric materials, which exhibit high hysteresis or require significant voltages for operation. In addition, polymer dielectric materials are susceptible to defects, such as voids, incomplete coatings, or inconsistent thickness. Particle-embedded polymers can suffer from agglomeration, poor mixing, or deterioration from aging. Other electroadhesive clutches employ rigid plates, which limit the surface contact between opposing clutch plates. It would therefore be advantageous to develop an improved dielectric material for electroadhesive clutches, improved methods for applying the dielectric material to the clutch plates, and clutch configurations that enable greater forces of adhesion at lower voltages.

Electroadhesive clutches are highly desirable for applications in which rotary motion needs to be controlled because of their low weight and low power consumption relative to other clutch technologies. In many applications, the required output torque exceeds the performance of a single pair of electroadhesive clutch plates given the practical constraints on the diameter of the device when it needs to fit into an assembly. This necessitates the use of multiple pairs of plates arranged in parallel such that their torque adds. However, using entirely rigid clutch plates in parallel presents many challenges, including issues with alignment, off-state friction, and effective load-sharing between pairs. It would be beneficial for a clutch configuration to overcome these challenges without requiring complicated alignment mechanisms or excessive plate pre-compression.

BRIEF SUMMARY

Disclosed herein is an electroadhesive clutch using a ceramic-based dielectric layer separating opposing clutch plates. At least one electrode is coated with the ceramic dielectric layer, although both may be coated. The dielectric may also be disposed between adjacent plates, but not permanently adhered to either. The dielectric layer may comprise aluminum oxide, titanium dioxide, and other ceramic oxides, which can be applied by a variety of methods. These methods include dip coating, electroplating, anodizing, etching, sol-gel reaction, plasma electrolytic oxidation (PEO), plasma conversion, chemical vapor deposition, physical vapor deposition, sputtering, spin-coating, laser conversion or other surface chemical reaction. The improved ceramic dielectric reduces the voltage required to adhere adjacent plates, while also improving the force of adhesion. As opposed to polymer-based dielectrics, the ceramic-based dielectric material of the present disclosure can have fewer defect sites that may be liable to short circuit, incur a dielectric breakdown, or cause corrosion. The improved dielectric enhances clutch performance by reducing residual adhesion, offstate friction, and hysteresis.

Further disclosed herein is a rotary electroadhesive clutch. The rotary clutch may comprise a pair of opposing clutch plates or a multitude of plates stacked in a unit. In an embodiment utilizing multiple plates, a first set of plates can be engaged with a shaft connected to the center of the plates and a second set of plates can be engaged with a housing connected to the outer periphery of the plates. A rotational force from the shaft will be transferred to the housing when the first set and second set of plates are engaged in an adhered stated.

Further disclosed herein is a rotary electroadhesive clutch utilizing a plurality of clutch pairs with at least one flexible clutch plate in each pair. The rotary clutch may comprise a pair of opposing clutch plates or a multitude of plates stacked in a unit. In an embodiment utilizing multiple plates, a first set of plates can be engaged with a shaft connected to the center of the plates and a second set of plates can be engaged with a housing connected to the outer periphery of the plates. A rotational force from the shaft will be transferred to the housing when the first set and second set of plates are engaged in an adhered stated. The flexible plate enables the stacked configuration, as plate alignment is more easily enabled, clutch torque is increased, and off-state friction is reduced. In one embodiment, the flexible clutch plate is mounted to a rigid backing through selective attachment points to facilitate torque transmission through the structure of the clutch.

BRIEF DESCRIPTION OF THE SEVERAL VIEWS OF THE DRAWINGS

FIG. 4A-4B show a rotary clutch with concentric clutch plates.

DETAILED DESCRIPTION

According to one embodiment of the disclosure is an electroadhesive clutch 100 achieving enhanced performance using a ceramic as the dielectric insulating material 101 between two adjacent electrodes, or clutch plates, 102. In a neutral state, a thin air gap or low friction state exists between the adjacent, opposing electrodes 102, allowing each electrode 102 to move independently. For example, with a rotary clutch 100, one electrode 102 may rotate while the other remains stationary. The air gap can be up to a few millimeters or, alternatively, the electrodes 102 have minimal contact resulting in a low frictional force. When a voltage difference is applied across the two electrodes 102, electrical charge is induced, or the electrodes 102 are otherwise charged or polarized, the separation between the two electrodes 102 is eliminated and they adhere to one another with a high attraction force, transmitting force across the interface when loaded. The voltage causes a positive charge to develop on one electrode 102 and a negative charge to develop on the opposing electrode 102, developing an electrostatic adhesion. The force of adhesion will remain provided the two electrodes 102 do not directly contact each other with low electrical resistance, which would equalize the electric charges. The force of adhesion will initially remain if the power supply is disconnected without removing the voltage difference, but will dissipate over time due to leakage current. The force of adhesion may also be lost if the electrodes 102 are grounded to each other or there is a dielectric breakdown. The dielectric material 101 electrically insulates one electrode 102 from an opposing electrode 102, preventing charge equalization.

Figure 2A:
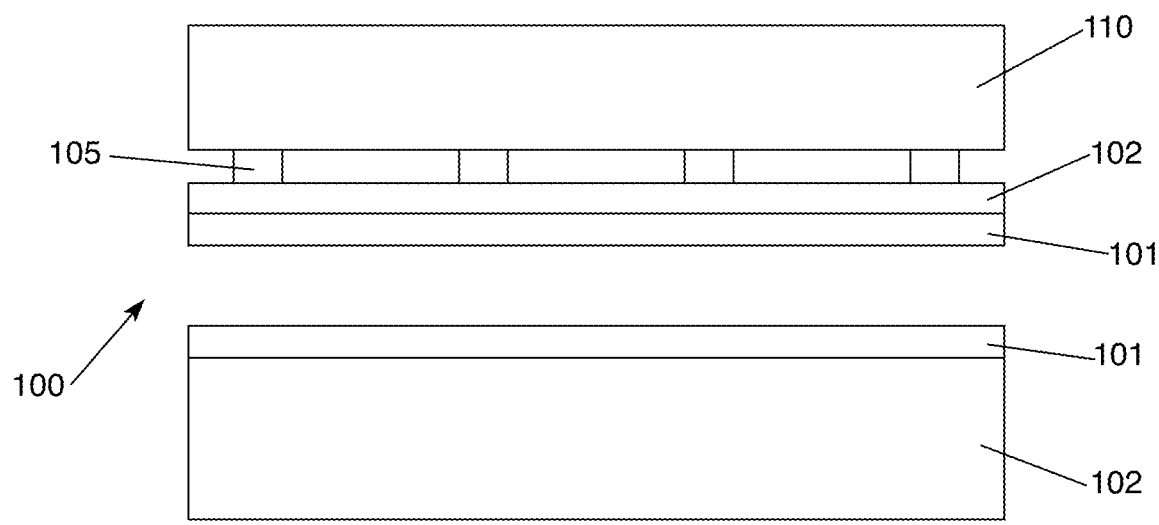
FIGS. 2A-2B depict rotary clutches with stacked plates.
Figure 2B:
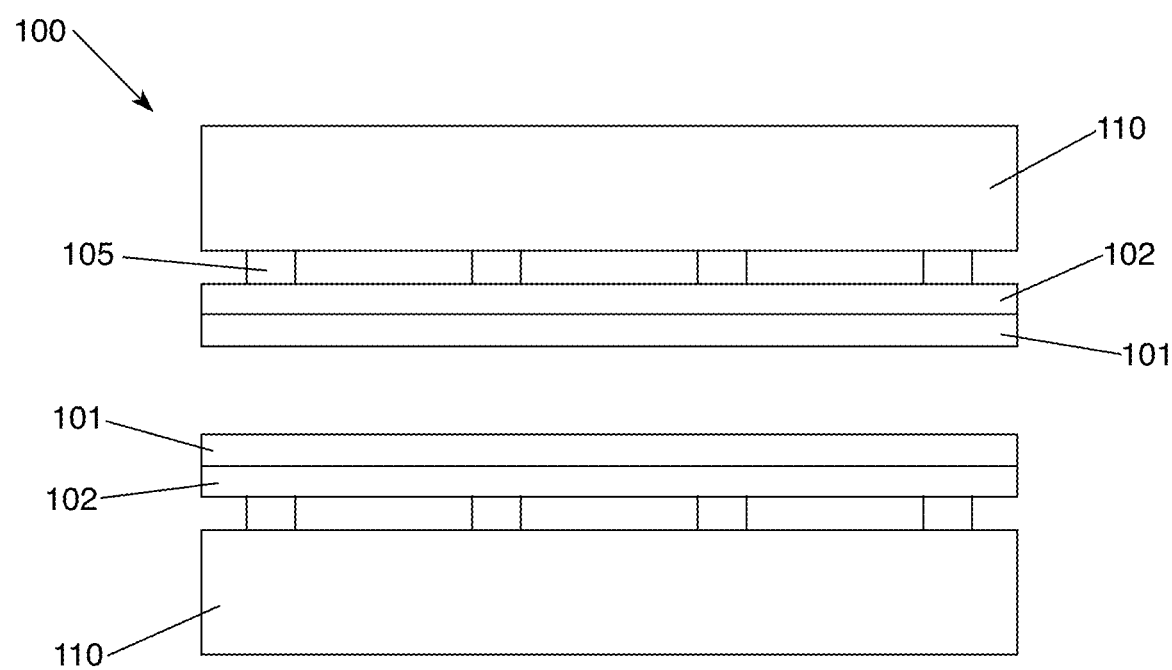

While the previous example clutch 100 has been described as having the opposing electrodes 102 in one of two states-fully engaged or disengaged—the clutch 100 can be operated in a partially engaged state. For example, FIGS. 2A-2B depict a rotary electroadhesive clutch 100 where the opposing electrodes 102 are controlled to permit limited rotational movement when engaged. Stated differently, in the active, partially-adhered state, one revolution in one electrode 102 does not result in a full revolution of the other electrode 102 because the surfaces of each electrode 102 are slipping relative to the other. This occurs when the voltage applied is insufficient to generate enough adhesion to fully transmit the applied torsional load. The torque threshold that separates the fully engaged state from the partially engaged state can be actively controlled in several ways: engaging less than the entire quantity of clutch plate 102 pairs, controlling voltage to modulate the adhesion experienced, or other methods.

In one embodiment, only one electrode 102 is coated with a dielectric layer 101, but both electrodes 102 may be coated. For example, depending on the intended application, coating two electrodes 102 can increase wear life or reduce leakage current. The dielectric coating will also affect the coefficient of friction, which is necessary for producing a force. In an alternative embodiment, the dielectric material 101 is not adhered to either plate 102. Rather, the dielectric material 101 is placed between adjacent plates 102, such as a free-standing ceramic wafer or thin film with a ceramic coating.

Figure 1:
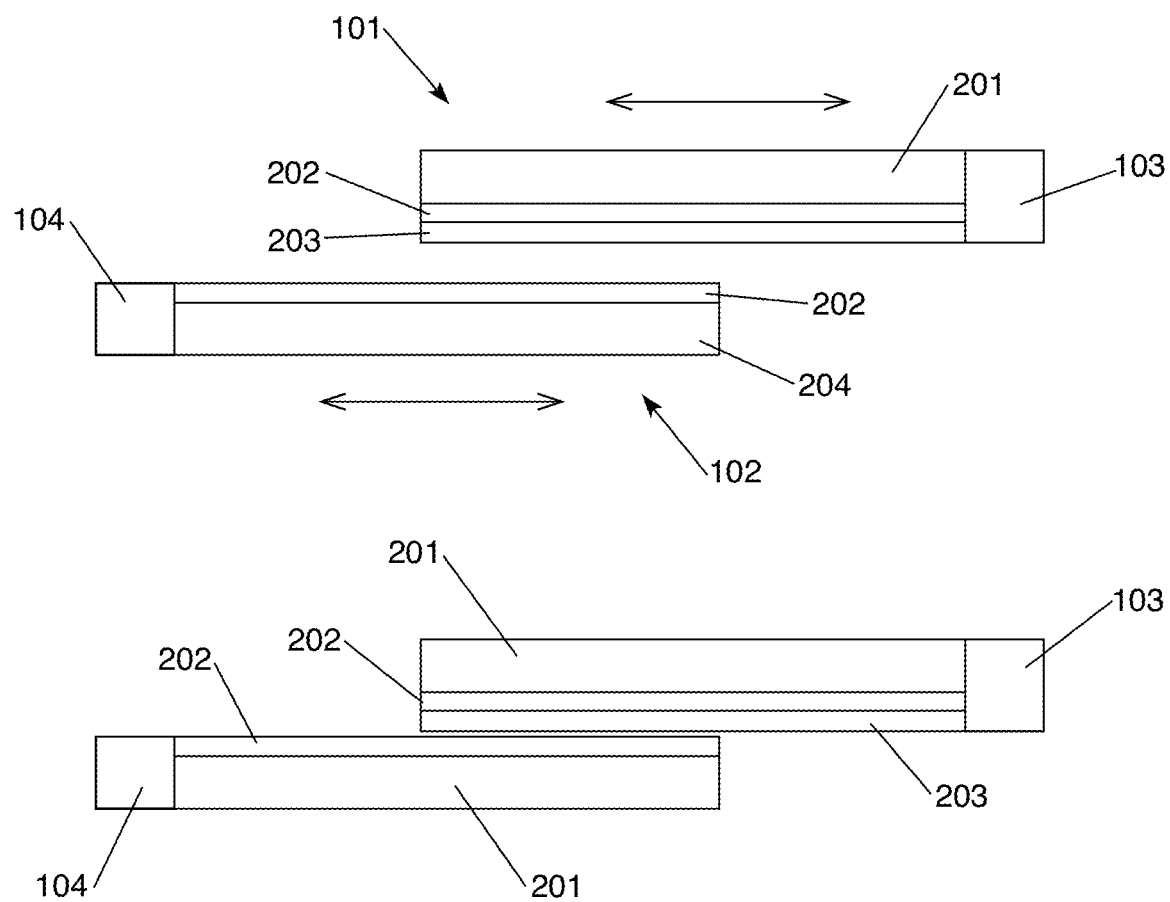
FIG. 1 is an example of a linear clutch using a ceramic-based dielectric.

When the voltage is removed, the electrostatic attraction between the electrodes 102 releases. As shown in FIG. 1, the clutch 100 includes at least one electrode 102 comprising a thin, flexible material. The thin, flexible material can include a foil, a polymer having a metal layer (i.e. aluminum-sputtered BOPET), an inherently conductive polymer or composite, carbon fiber or graphene, or similar electrically-conductive materials. The thin, flexible electrode 102 is able to deform, eliminating the air gap and conforming to the surface of the opposing electrode 102 when a voltage is applied. This enables both low off state friction when deactivated, and greater true surface contact when activated, which enhances on-state clutch plate adhesion and torque transmission. In some embodiments, the thin electrode 102 can be attached to a rigid substrate 110 to enable transmission of a force, while still allowing the thin electrode 102 to deform during operation. For example, FIG. 2A shows a flexible electrode 102 connected to a rigid frame assembly 110 through the use of a pressure sensitive adhesive, selective sintering, welding, rivets, swages, bolts, heat stakes, stitches, adhesives, or epoxies 105. If the opposing electrode 102 is thick and/or rigid, a force can be transmitted without the use of a substrate 110.

Higher performance and lower operating voltage are enabled by the use of a ceramic-based dielectric insulating layer 101, compared to previously demonstrated polymer insulators and composite insulators made of ceramic particle-embedded polymers. Table 1 shows a comparison of some common dielectric materials and the ceramic-based dielectric materials of the present disclosure. The force per unit area of the clutch 100 is dependent on the thickness of the dielectric insulating layer 101 separating the electrodes 102, the voltage applied, the dielectric constant of the dielectric material 101, breakdown strength, and surface resistance of the dielectric insulating layer 101, and the ability of the overall clutch plate structures 102 to conform and allow good surface contact at the clutch interface.

The force/voltage hysteresis refers to unwanted residual adhesion and voltage that remains even after the voltage is removed and can reduce clutch 100 responsiveness or holding force on subsequent charge and discharge cycles. This can result from charges becoming trapped in the surface of the dielectric material 101, or from the dielectric material 101 itself becoming semi-permanently polarized. The magnitude of both of these effects and their impact on clutch hysteresis are dependent on the characteristics of the dielectric material 101 utilized in the clutch 100. This force/voltage hysteresis is further affected by clutch symmetry or non-symmetry, which refers to configurations where both clutch electrodes 102 are coated with the dielectric material 101 (i.e. symmetric) or only one electrode 102 is coated (i.e. non-assymetric). The clutch 100 performance can also be affected by how the charge (i.e. negative or positive) is applied to the coated electrode 102 in the non-asymmetrical clutch 100. Ceramic-based dielectric materials 101 show lower clutch hysteresis behavior.

TABLE 1

|  | Dielectric material | Dielectric layer thickness (um) | Force per unit area (N/cm^2) | Operating voltage (V) | Force/Voltage Hysteresis |
| --- | --- | --- | --- | --- | --- |
| Commonly used polymer dielectric materials | Polyimide, polyethylene, PVDF | 5-50 | 0.1-2 | 500-2000 | High |
| Prior art dielectric layers (years 2014-2021) | DUPONT Luxprint 8153 ceramic particle-embedded polymer | 20-100 | 1-2 | 250-350 | Low |
|  | Aluminum Oxide | 0.5-50 | 4-30 | 12-300 | Very Low |
|  | Titanium Dioxide | 1-10 | 20-100 | 5-200 | Very Low |

With a lower dielectric layer thickness, lower voltages may be used to achieve high holding forces. However, with thinner dielectric layers, there is also a greater risk of electrical shorting occurring at defect sites, common in polymer-based coatings. Ceramic materials can be applied as thin, defect-free layers by chemical, vapor deposition, or electrochemical means, reducing the risk of electrical shorting.

The ceramic dielectric layers 101 of the clutch 100 can be created by anodizing a metal substrate, such as aluminum, titanium, magnesium, zinc, zirconium, tantalum, and other metals, to create the ceramic layer directly on the metal, which acts as the electrode 102. The clutch plate 102 can be formed from the metals or alloys containing the metals. Alternatively, the clutch plate 102 may comprise a substrate 110 with a metal or metal alloy disposed on the surface of the substrate 110. For example, the dielectric layer 101 can be created by sputtering metals onto a substrate and processing the metal through an oxygen chamber to oxidize the surface of the thin metal while leaving some of the metal layer intact beneath the oxidized layer, in order to act as the conductive electrode 102. In this case, the substrate 110 acts as a carrier to facilitate production, and to help transmit force through the clutch plate 102 under loading during clutch 100 operation. Another method includes chemical vapor deposition or sputtering to deposit ceramic directly onto a surface on an electrode 102. In another embodiment, a free-standing ceramic dielectric layer 101 can be sputtered with a metal layer on one side to create a clutch plate 102 where the dielectric layer 101 will contact the opposing clutch plate 102 surface.

The ceramic layer 101 can also be based on a single or multiple types of metal cations in combination with common anions including carbide, oxide, nitride, sulfide, fluoride, silicate, titanate, zirconate, and aluminate. In these examples, nano- or microparticles of ceramic can be embedded into a polymer matrix to form a paintable, printable, or sprayable material. Other solvents or carriers can also be used to enable application of the dielectric material 101 onto the surface of the clutch plate 102. The particles can have a size of 1-100 μm, or alternatively, 1-1,000 nm. In one embodiment, the dielectric material comprises barium titanate (BaTiO3) dispersed in a fluoropolymer maxtrix.

In the methods described above, the dielectric layer 101 is formed of a substantially homogeneous or uniform layer of ceramic typically with at least 50% weight percentage. The dielectric layer 101 may have imperfections and/or a microstructure that results from the anodization process or other processes. Further, the dielectric layer 101 may include small quantities of additives (for example, pigments for color). In one embodiment, the dielectric layer 101 is a uniform oxide ceramic, forming a continuous layer on the surface of the electrode 102.

In the example of anodizing, a metal surface is immersed in a highly acidic solution and used as an anode to complete an electrochemical oxidation process, as is known in the art. This is most commonly applied to aluminum alloys but can also be applied to similar metals, titanium, zirconium, niobium, zinc, tantalum and magnesium. Many acidic solutions can be used as the electrolyte, most commonly including sulfuric acid, boric acid or chromic acid. The process is generally applied between 1 and 100V and controlled by cooling the solution, time of application and voltage. The resulting surface is generally porous, with columnar pores on the order of 1-100 nm diameter which may be dyed using common dye chemicals and sealed using boiling water or chemical sealing agents to give a more robust surface. Other examples of oxidative processes can be used to give a pore-free surface instead, for example plasma electrolytic oxidation. This process can be controlled more precisely to achieve consistent dielectric layer 101 thickness, uniformity, and low defects, compared to screenprinted composite dielectrics, for example.

After anodizing, the dielectric 101 may have a natural columnar porosity. A heat treatment can be used to remove pore bound water, changing the overall dielectric properties of the layer 101 and to limit Faradaic processes under voltage application. For example, Faradaic currents may result from water-based electrochemical reactions. Excluding water from the dielectric layer 101 can reduce these reactions. Liquids, gases, or oils can also be introduced into the pores of the anodized dielectric layer 101 through immersion, sonication, vacuum, spraying, and other similar techniques.

Liquids may include water miscible lab solvents, such as ethanol, methanol, isopropanol, acetone, THF, acetonitrile, dioxane, and DMSO. Water immiscible solvents can also be used, such as hexane, toluene, benzene, butanol, dichloroethane, dichloromethane, MEK, chloroform, ethers, aliphatic alcohols, aromatic alcohols, xylene. These water immiscible solvents have the ability to improve dielectric properties and to exclude water from the surface of the dielectric layer 101. Dielectric oils can also be introduced into the pores of the anodized layer 101. Oils may include mineral oils, silicone oils, vegetable oils, petroleum oils, and other similar oils. Gases introduced into the pores of the anodized layer 101 include inert gases, such as nitrogen, argon, helium, krypton, air, carbon dioxide, sulfur hexafluoride, carbon monoxide, nitrous oxide.

The surface morphology of the dielectric layer 101 can be controlled through the application of heat and/or pressure using a flat press, roller, or similar device. The press, roller, and other devices can also be used to impart a texture or pattern to the surface of the dielectric 101, which affects the coefficient of friction and holding force in the electroadhesive clutch 100. Textures and other surface features 120 may include nano- or micro-scale holes, trenches, pores, embossed regions, debossed regions, pillars, waves, ridges, dimples, zigzags, slits, dents, or selective non-conductive coatings. Textures and features 120 may also be imparted using blades, laser ablation, patterned masks, media blasting, selective coating, chemical etching, and electrochemical dissolution. The surface of the dielectric layer 101 and/or electrodes 102 may have selective roughness, a mixture of textures and features 120, or regions with features/roughness combined with smooth regions. Surfactants such as silanes or siloxanes can also be used to modify the surface of the dielectric layer 101 and/or electrodes 102.

The devices 100 described herein may be used as clutches, brakes, dampers, or torque limiters and can be used to prevent relative motion between two components. Multiple uses of each device 100 is enabled by strategic control of the applied voltage. High voltages will enable the devices to produce large forces or torques to resist motion or lock the relative position of components. Medium voltages will supply lesser forces or torques which may be overcome by the user or driving actuator. In this case, the devices 100 described here act as torque transmitters, dampers or resistive mechanical loads.

The figures show various clutches 100 utilizing the solid ceramic-based dielectric layer 101. FIG. 1 shows a linear clutch 100 with one thin, flexible electrode 102 and one thick electrode 102, both coated with a dielectric material 101, where the thin electrode 102 is loaded in tension, and the thick electrode 102 used to transmit an in-plane force in multiple directions or an in-plane torque. Alternatively, the linear clutch 100 may comprise two thin flexible electrodes 102, one or both coated with a dielectric layer 101. The electrodes 102 transmit force through tension.

FIGS. 2A-2B show a linear clutch 100 with one thin electrode 102 selectively adhered to a rigid substrate 110 and one thick electrode 102, one or both coated, or two thin electrodes each adhered to a rigid substrate 110 where the clutch 100 can be loaded in in-plane tension, in-plane compression, or in-plane torsion.

Figure 3A:
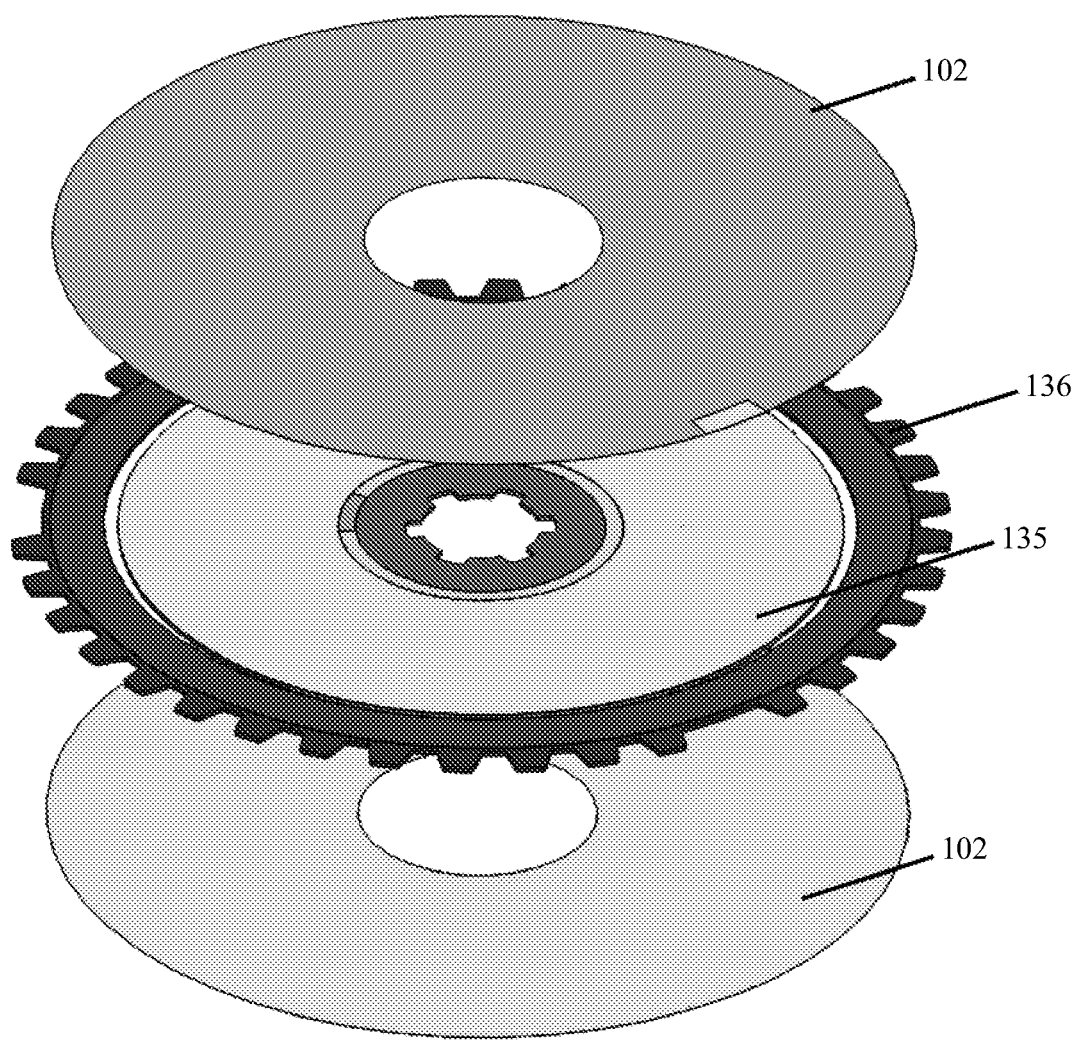
FIGS. 3A-3B are rotary clutches with nested, stacked plates that transmit torque to a housing.
Figure 3B:
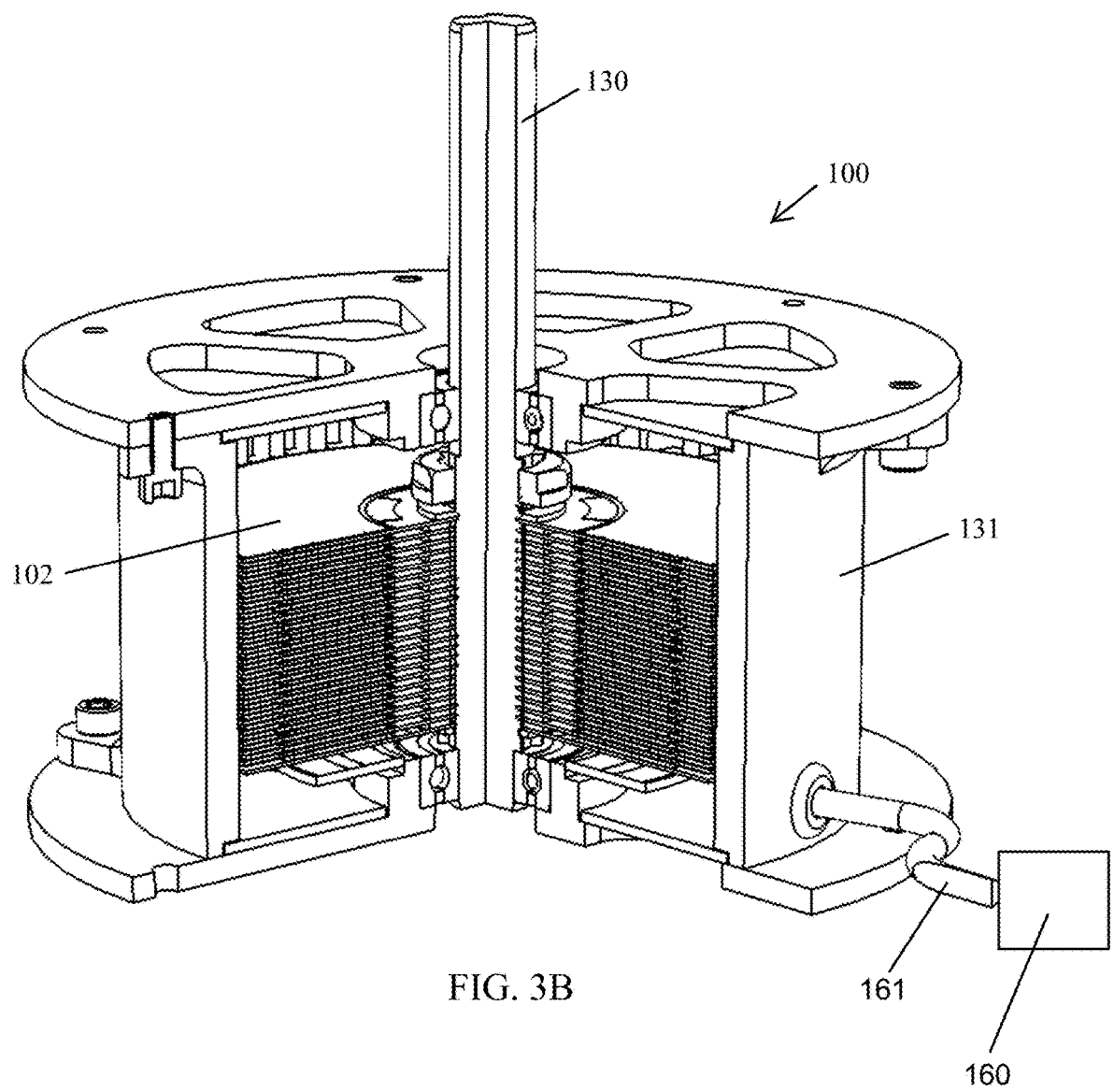

FIGS. 3A-3B depict a rotary clutch 100 with parallel plates 102 that transmit torque between an input shaft 130 and a housing 131, where the plates 102 are oriented perpendicular to the shaft 130. A thick electrode 102 can be used for both electroadhesion and force transmission, while a thin electrode 102 is connected to a frame or substrate 110 that transmits torque between the electrode 102 and the housing 131 or shaft 130.

FIGS. 4A-4B show a rotary clutch 100 consisting of a tube-shaped thick electrode 102 or curved thick electrode 102, and a thin electrode 102 draped around the circumference of the thick electrode 102 and connected to a torque-transmitting frame 110.

Figure 5:
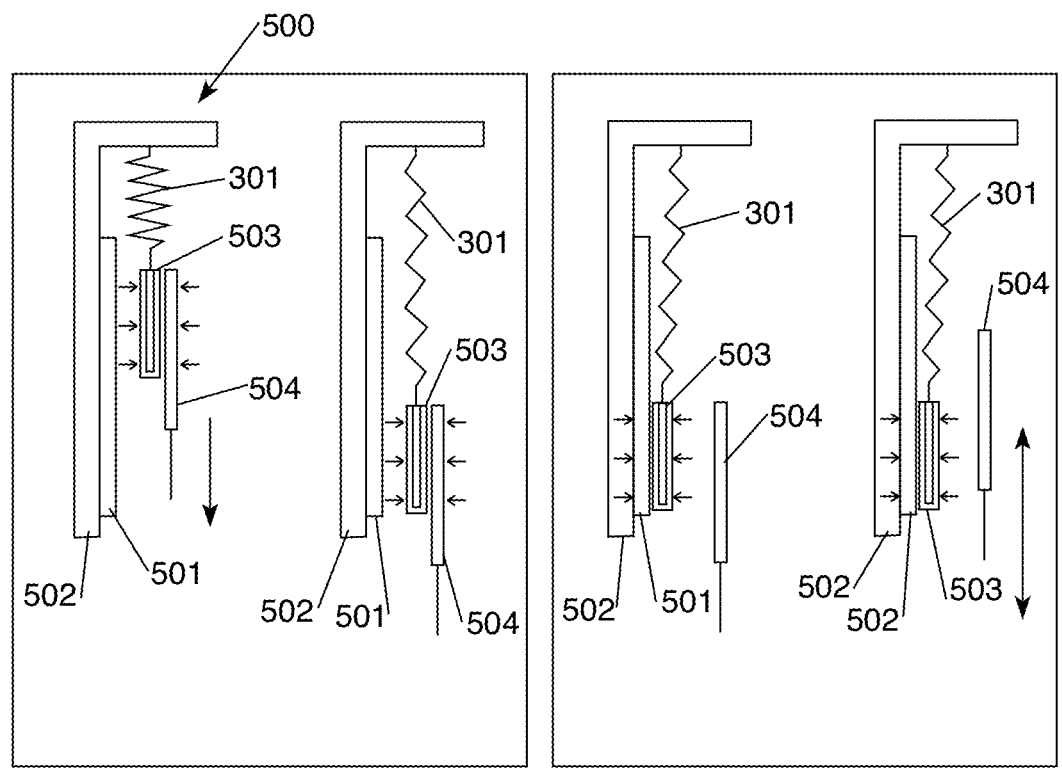
FIG. 5 is a clutch used in an energy recycling actuator.
Figure 5:
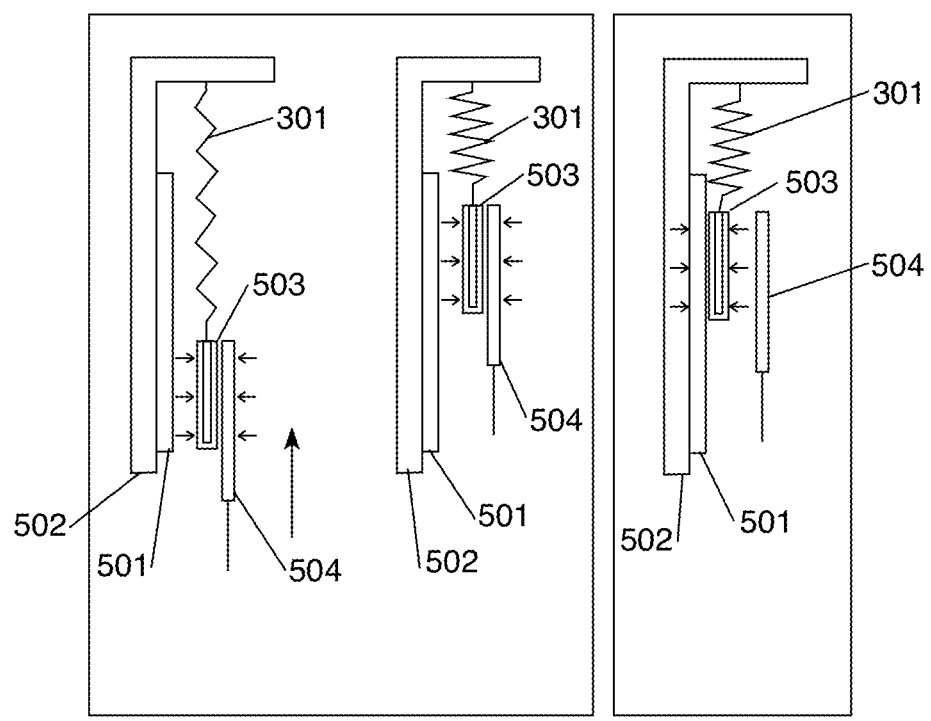

FIG. 5 is an energy recycling actuator using multiple double-clutched springs in parallel with one another, where the connection of each spring to either the output or the housing is controlled with electroadhesive clutches 100.

Figure 6:
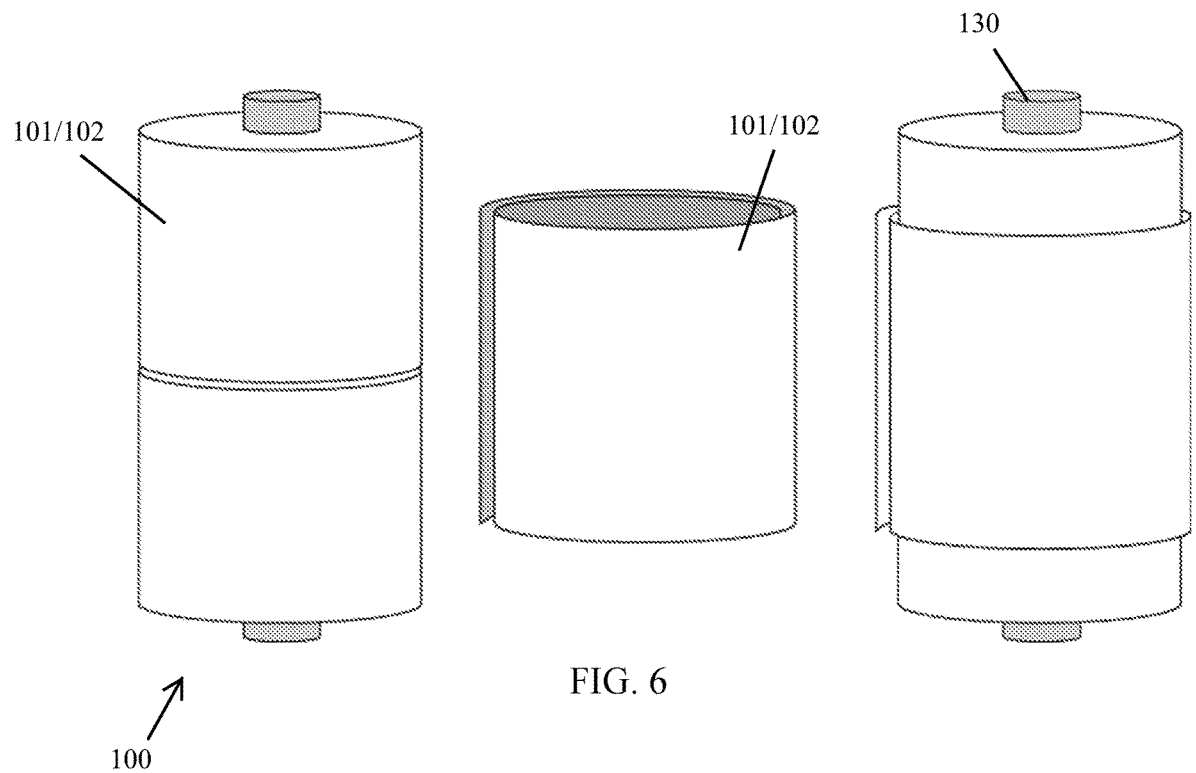
FIG. 6 is a rotary clutch with separate cylindrical surfaces.

FIG. 6 shows a rotary clutch 100 in which two separate cylindrical surfaces (concentric and of equal diameter) are wrapped by a thin electrode 102 that bridges the gap between the cylindrical surfaces, acting as a second electrode 102. The cylindrical surfaces 102 may be ceramic coated, forming the dielectric layer 101. When the clutch 100 is active, the thin electrode 102 adheres to both cylindrical surfaces 102 thus locking them together. When the clutch 100 is disengaged, the two cylindrical surfaces 102 can rotate freely relative to one another. The portion of the thin electrode 102 that bridges the gap between cylindrical components may be thicker to prevent wrinkling or reinforced by adhering it to a strip of stronger or stiffer material. The collar may be made out of rolled sheet metal that is bent to a diameter slightly smaller than the diameter of the cylindrical component 102 such that it hugs the cylinders 102 when it is stretched and placed over the cylinders 102. Alternatively, the thin electrode 102 can be permanently attached to one of the two cylindrical surfaces 102 while allowing the thin electrode 102 and other cylindrical surface to interact in the same way.

By way of further detail, as shown in FIG. 6, the two cylindrical surfaces 102 share a common axis of rotation (left image); a thin, flexible rolled collar is present (middle image); and the collar is wrapped around both cylinders 102 such that the gap between them is bridged. The collar may be permanently attached to one or neither of the cylinders 102. When voltage is applied to the collar and the cylindrical surfaces 102 they adhere, thus locking the relative angular positions of the cylinders 102 together. The dielectric coating 101 may be applied to the collar, the cylinders 102, or both.

Figure 7:
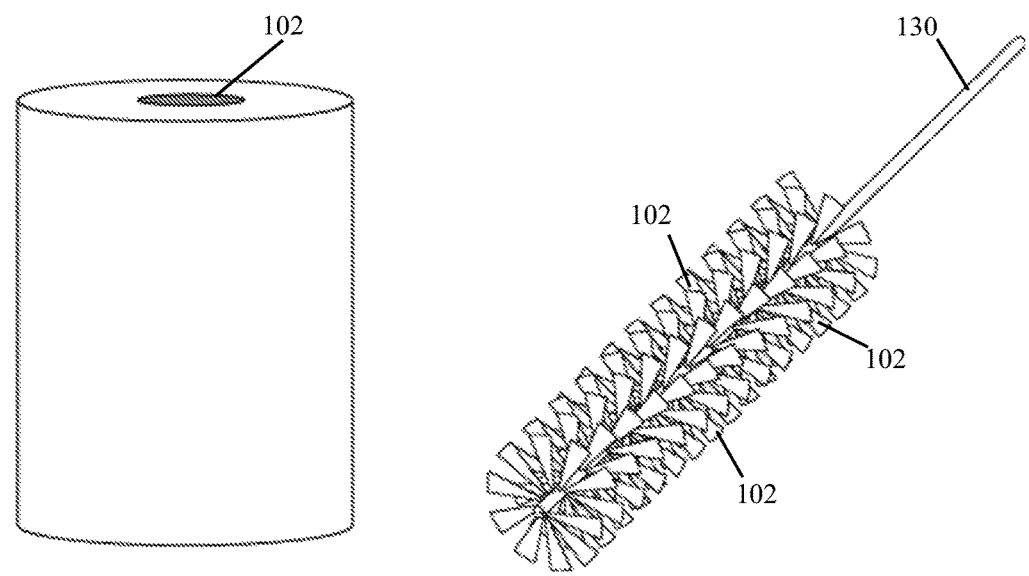
FIG. 7 is a tube-shaped clutch.

FIG. 7 is a linear clutch 100 in which one electrode 102 is tube shaped and the other electrode 102 consists of a brush attached to a Bowden cable. The undeformed diameter of the brush is wider than the inner diameter of the tube such that the brush deforms and maintains contact with the sides of the tube when it is inserted. The brush bristles are thin and wide and may be made of metallic components or carbon fiber. When charged, the bristles adhere to the lining of the tube. One or both the bristles and the tube's inner liner may be coated with a dielectric material 101.

As shown in FIG. 7, this clutch 100 is to be used inside a hollow tube that may be flexible or rigid. A cable or other long thin element runs through the hollow tube and moves relative to the tube along the tube's axis. The brush bristles are composed of thin sheets of conductive material that conform to the inner shape of the tube and maintain contact with the inside surface of the tube. The inside of the tube is coated with a dielectric and the brush may be bare conductive material or coated as well. The bristles of the brush adhere to the inner surface of the tube when voltage is applied. The bristles may be incorporated into the cable during the cable twisting process.

Figure 8:
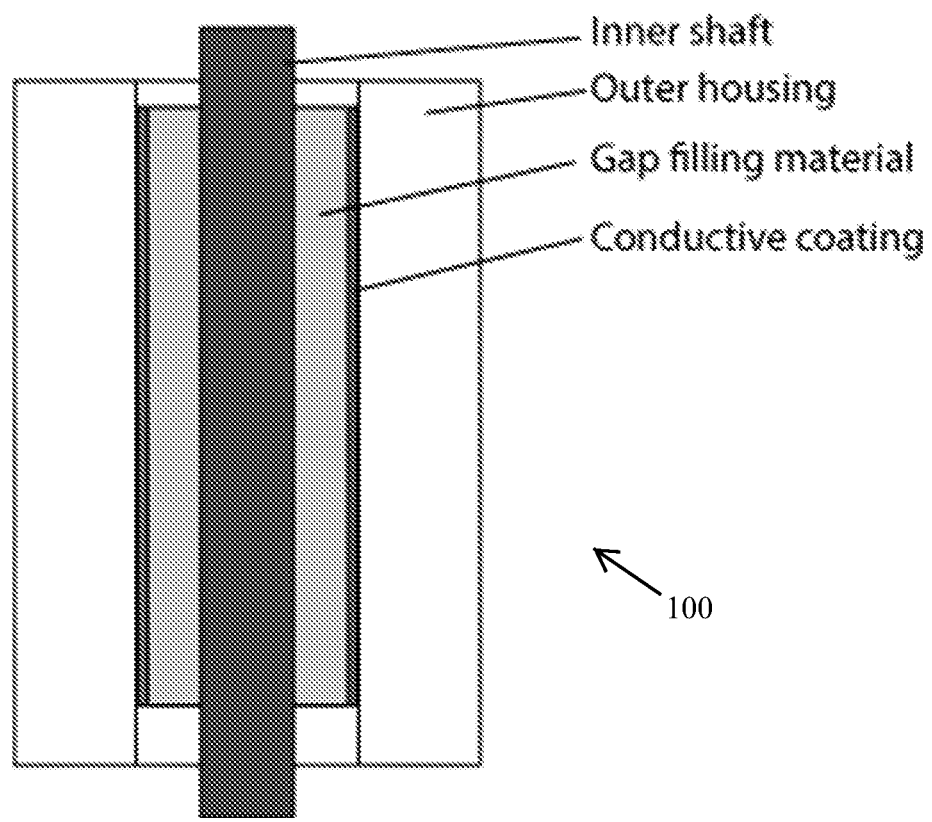
FIG. 8 shows a combination linear and rotary clutch.

FIG. 8 is a cross sectional view of a combination linear and rotary clutch 100. One electrode 102 is tube shaped and the other electrode 102 is cylindrical and fits inside the tube. The inner cylindrical component is free to both rotate and translate around (i.e. rotate) and along (i.e. telescope) the axis of the tube. Contact is maintained between the cylinder and the tube either through a brush or via a low stiffness gap filling material that is coated with conductive material. If the gap filling material is conductive itself, an additional coating will not be necessary.

The clutch is split into two components: the outer housing (white) and the inner shaft (shades of grey). The outer housing is hollow with an internal cylindrical surface that is coated with a dielectric material 101. The inner shaft is fixed to a compressible gap-filling material such as a rubber gasket or foam. This gap filling material is coated with a conductive material. When voltage is not applied, the shaft is free to slide along and rotate about the housing's axis. When voltage is applied, the conductive coating on the gap-filling material adheres to the housing's inner surface. This locks the joint preventing both relative rotation and sliding.

Figure 9:
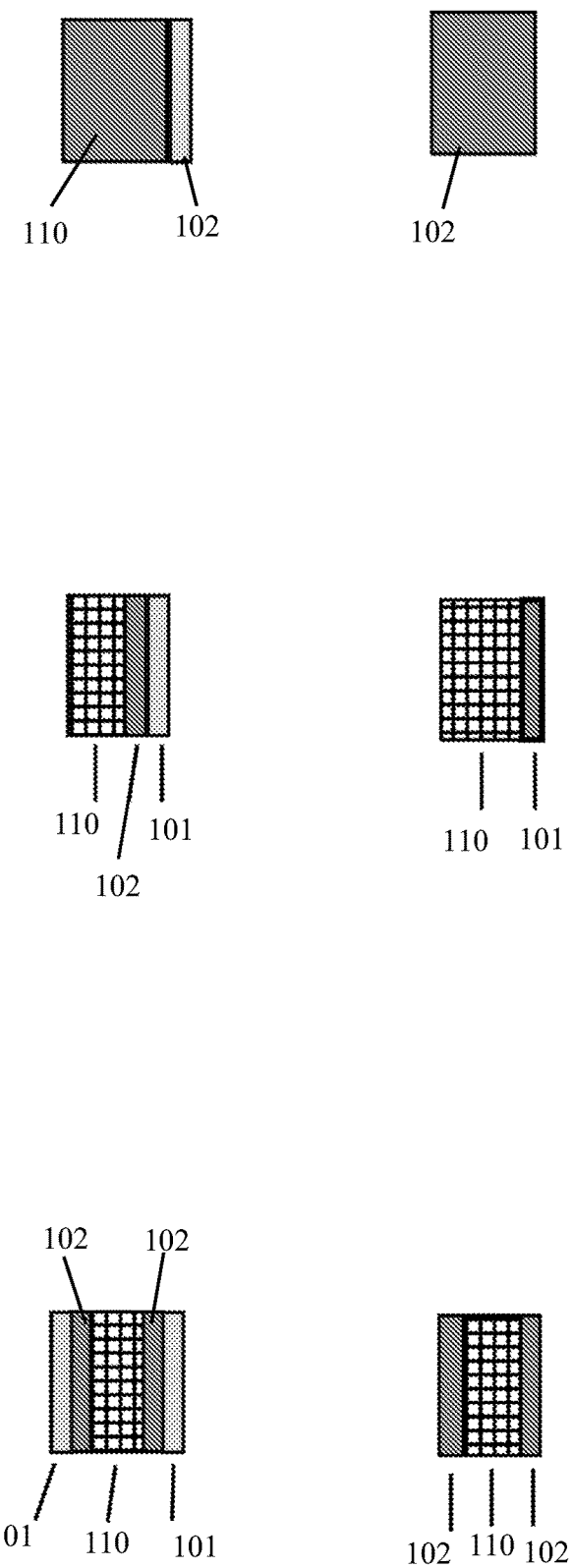
FIG. 9 shows a number of potential electrode compositions.

FIG. 9 shows a number of potential electrode 102 configurations. In order for the clutch 102 to operate, each clutch pair must include two electrodes 102 separated by a dielectric material 101. The dielectric 101 may be on one electrode 102 or both. Each individual electrode 102 may be a bare metal or other conductive material, or a conductive layer deposited on or adhered to a carrier 110 that may be insulating or conductive. In some cases, the electrode may include a conductive electrode on both sides of the carrier 110. Each of these configuration is also possible with the addition of a dielectric coating 101. In some embodiments, the carrier 110 with conductive electrodes 102 on both sides may have insulating dielectric 101 coated on the surfaces of both electrodes 102.

Figure 10:
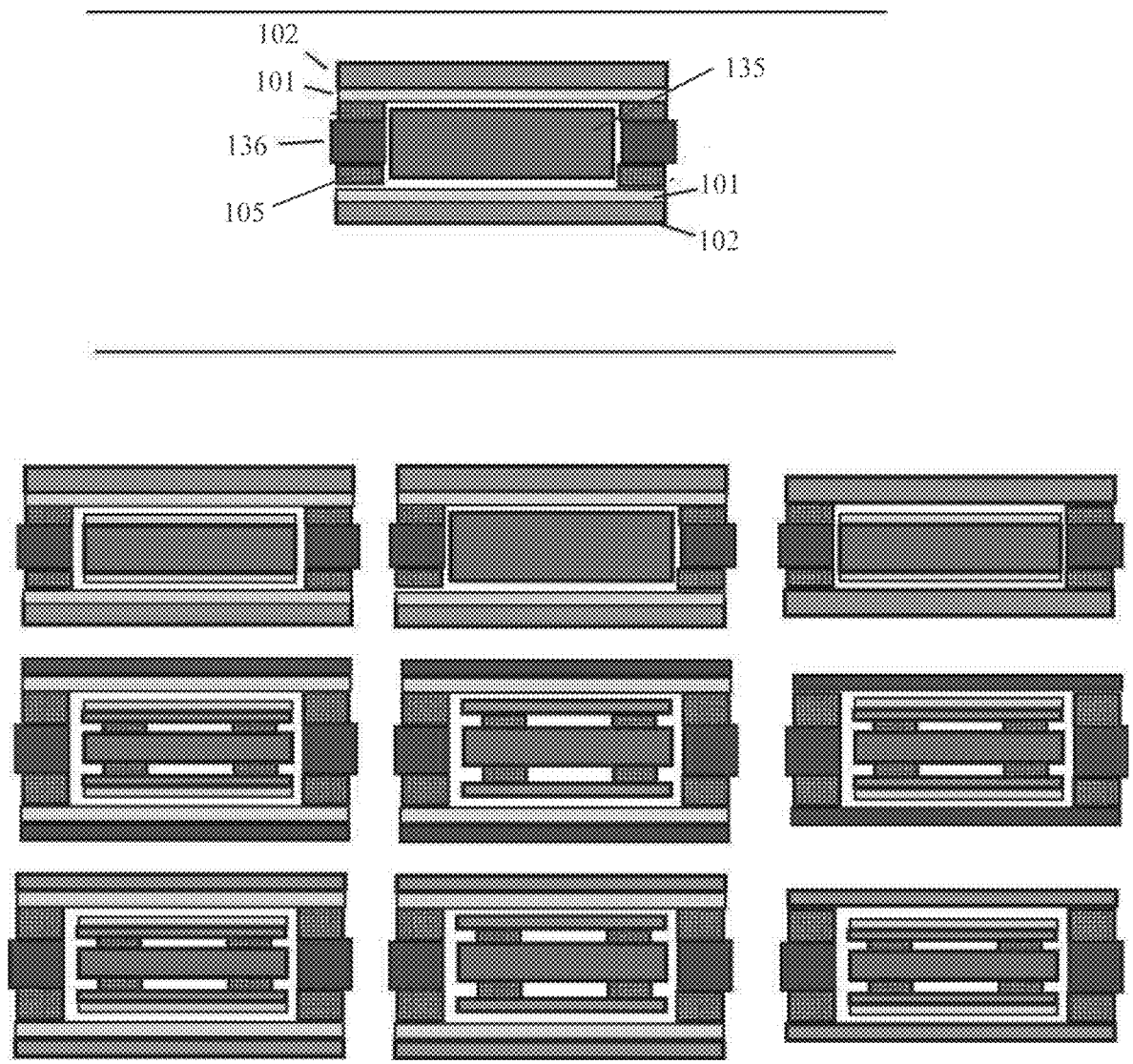
FIG. 10 shows a number of potential electrode configurations for a nested rotary clutch.

FIG. 10 shows a simplified crossectional view of a number of potential electrode 102 configurations for a nested rotary clutch 100. The basic configuration shows a rigid outer frame 136 in the shape of a ring (darkest gray) connected to two electrodes 102 (medium gray) with a double sided adhesive (speckled). The rigid, ring-shaped outer frame 136 and its electrodes 102 enclose an inner frame 135. The outer 136 transmits mechanical load to the housing 131 and the inner frame 135 transmits mechanical loads to the shaft 130. The inner and outer electrodes 102 can each be flexible or rigid in any combination other than both being rigid. Dielectric material 101 may be deposited on both electrodes 102, just the inner electrode 102, or just the outer electrode 102. Nine configurations demonstrating combinations of these features are shown in FIG. 10. These configurations are arranged in a grid. The top row represents all the configurations in which both the inner electrode 102 is rigid and acts as both the electrode 102 and the frame 135. The middle row represents all the combinations in which the inner frame 135 includes a flexible electrode 102 and the outer electrodes 102 are rigid (black). The bottom row represents all the configurations in which both the outer and inner electrodes 102 are flexible. The left column represents all the configurations in which dielectric material 101 is deposited on both inner and outer electrodes 102. The middle column represents all the configurations in which dielectric material 101 is deposited only on the outer electrode 102. The right column represents all the configurations in which a dielectric coating 101 applied to the inner electrode 102 and not the outer electrode 102.

Figure 11:
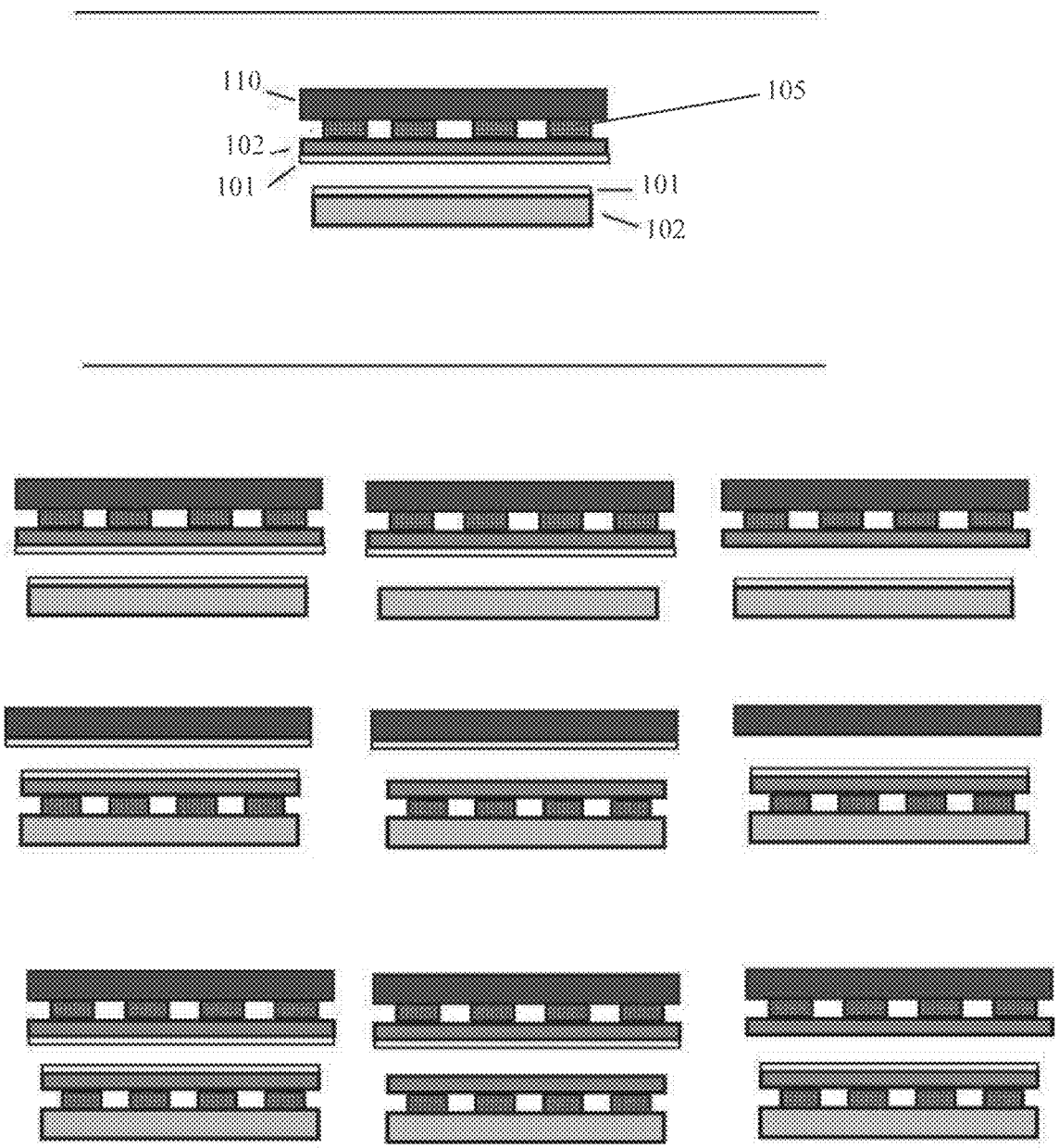
FIG. 11 shows a number of potential electrode configurations for a stacked rotary clutch.

FIG. 11 shows a simplified crossectional view of a number of potential electrode 102 configurations for a stacked rotary clutch 100. The basic configuration shows a rigid outer frame 136 in the shape of a ring (darkest gray) connected to an electrode 120 (medium gray) with double sided adhesive applied in a pattern (speckled). The rigid, outer frame 136 is stacked adjacent to an inner frame 135 such that their electrodes 102 are touching or have a small airgap. The outer 136 transmits mechanical load to the housing 131 and the inner frame 135 transmits mechanical loads to the shaft 130. The inner and outer electrodes 102 can each be flexible or rigid in any combination other than both being rigid. Dielectric material 101 may be deposited on both the outer and inner electrode 102, just the inner electrode 102, or just the outer electrode 102. Nine configurations demonstrating combinations of these features are shown in FIG. 11. These configurations are arranged in a grid. The top row represents all the configurations in which both the inner electrode 102 is rigid. The middle row represents all the combinations in which the inner frame 135 includes a flexible electrode 102 and the outer electrodes 102 are rigid (black). The bottom row represents all the configurations in which both the outer and inner electrodes 102 are flexible and both adhered to a rigid frame 135/136 using patterned adhesive. The left column represents all the configurations in which dielectric material 101 is deposited on both inner 135 and outer frames 136. The middle column represents all the configurations in which dielectric material 101 is deposited only on the outer electrode 102. The right column represents all the configurations in which a dielectric coating 101 is applied to the inner electrode 102 and not the outer electrode 102.

Figure 12:
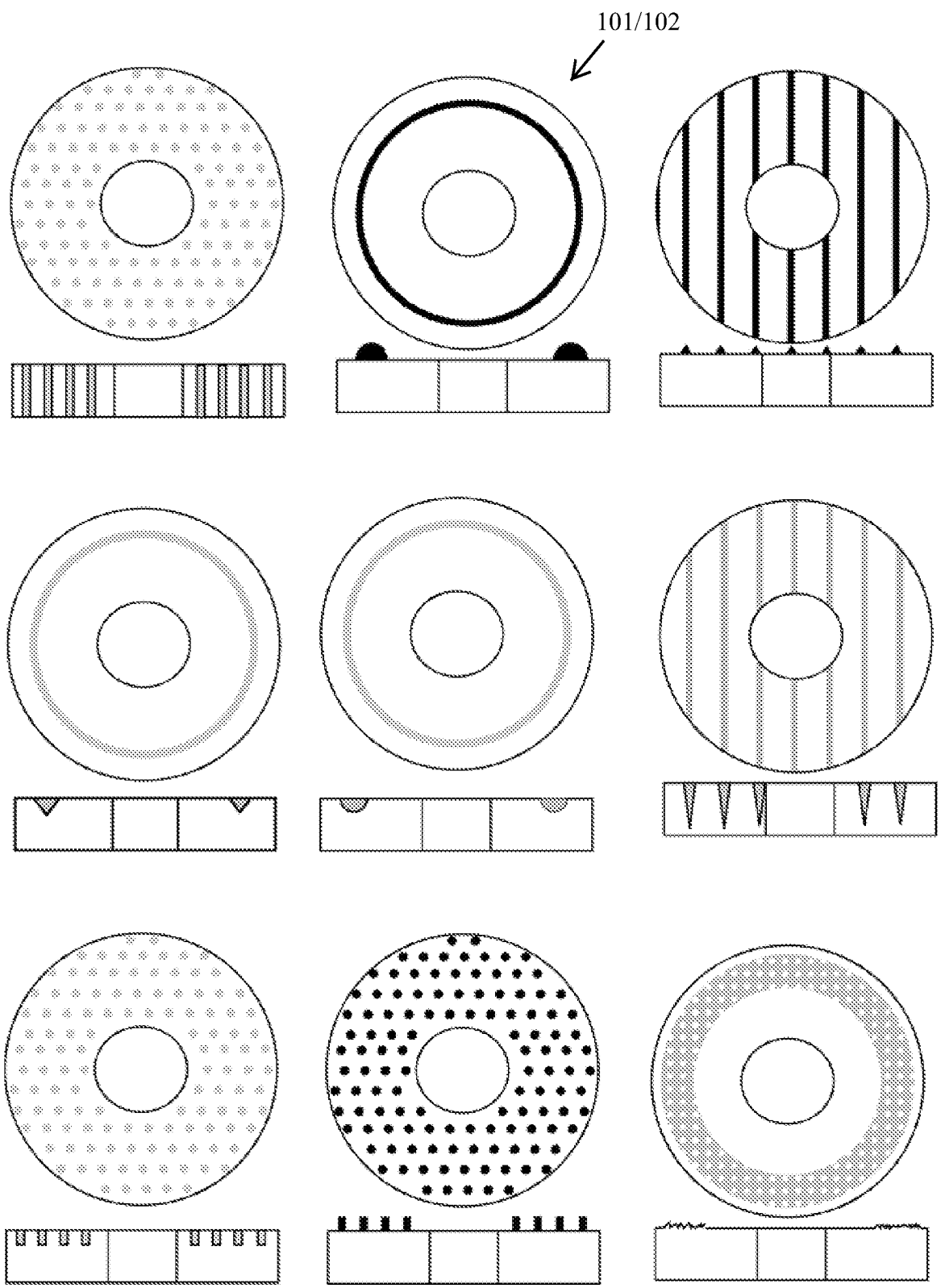
FIG. 12 shows a number of patterning/texturing strategies.

FIG. 12 shows a number of patterning and texturing strategies that can be used to apply features 120 to the electrodes 102 or dielectric layer 101 to provide improved release after deactivation and/or to strategically change the effective coefficient of friction to improve on-state holding force or reduce off-state friction. These strategies include (from left to right, top to bottom): holes, embossing, ridges, trenches, debossing, slits, pores, pillars, and regions of increased roughness. The locations of the features 120 shown are only illustrative. These features 120 can be of any size and can be located anywhere on the surface of the clutch plate 102 or dielectric 101, even non-symmetrically. Also, multiple types of features 101 may be combined on a single plate 102 or across two paired clutch electrodes 102 to create different patterns or effects.

Figure 13:
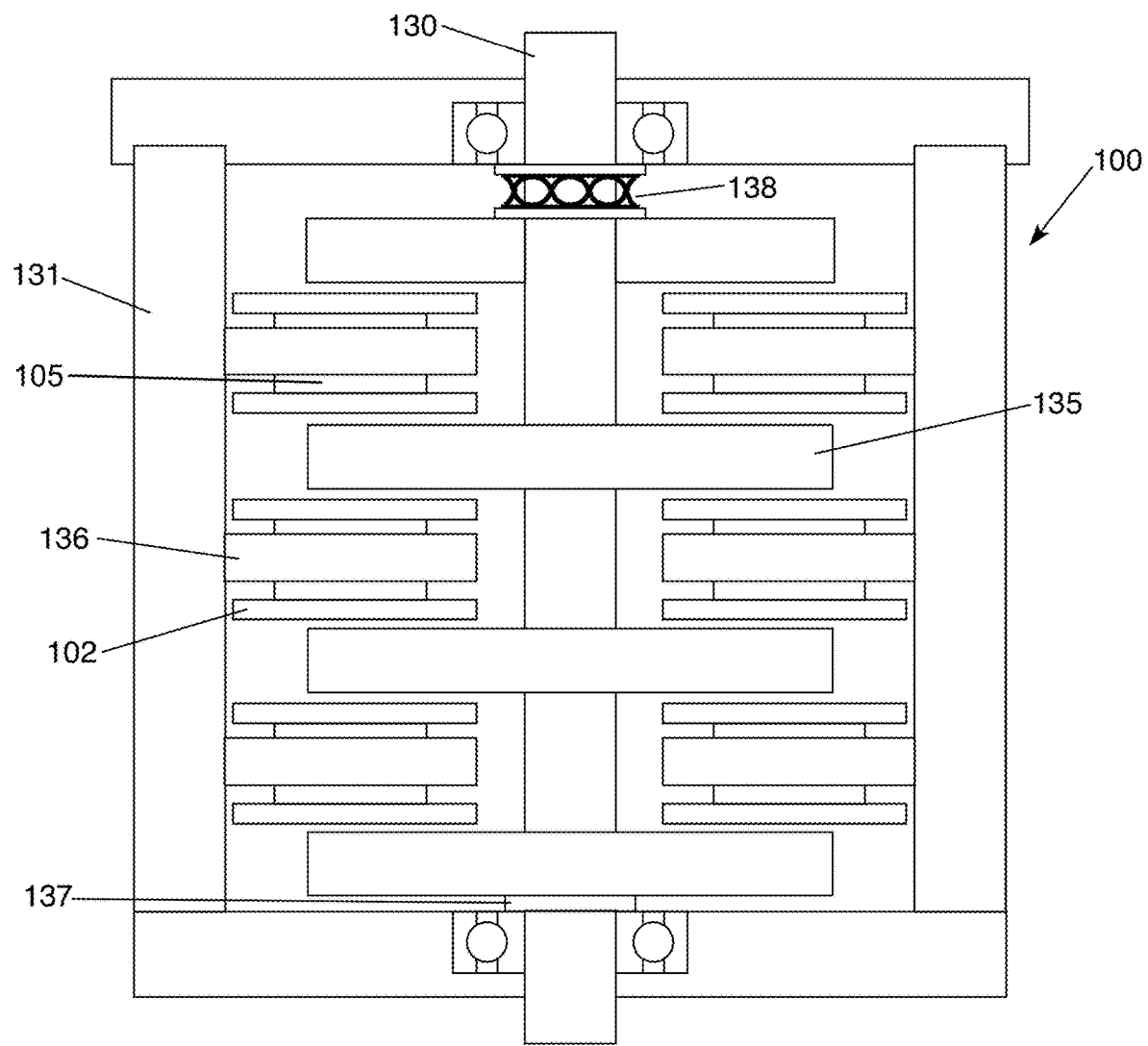
FIG. 13 is a rotary clutch with multiple stacked clutch pairs with inner frames on ends of stack.

FIG. 13 is a rotary clutch 100 with multiple stacked clutch pairs with inner frames 135 on the ends of a stack of clutch plates 102. Compression is maintained through the stack using a wave washer 138 on the top inner frame 135 and a retaining ring 137 mounted in a groove on the shaft 130 at the bottom of the stack. Any multitude of clutch frames 135/136 can be stacked on top of each other to increase the torque capacity of the clutch 100 as a whole. The shaft 130 is connected to the cylindrical housing 131 through two bearing connections in hubs on the face of the housing 131. The inner frames 135 interact with the shaft 130 and the outer frames 136 interact with the housing 131. This embodiment may also be altered to directly include a motor, gears, or other actuator or transmission component within the housing 131. Alternatively, the clutch plates 102 may be placed without these auxiliary components into the housing of a gearbox, motor, or other actuator without the need for duplication of pre-existing auxiliary components in these devices such as bearings.

Figure 14:
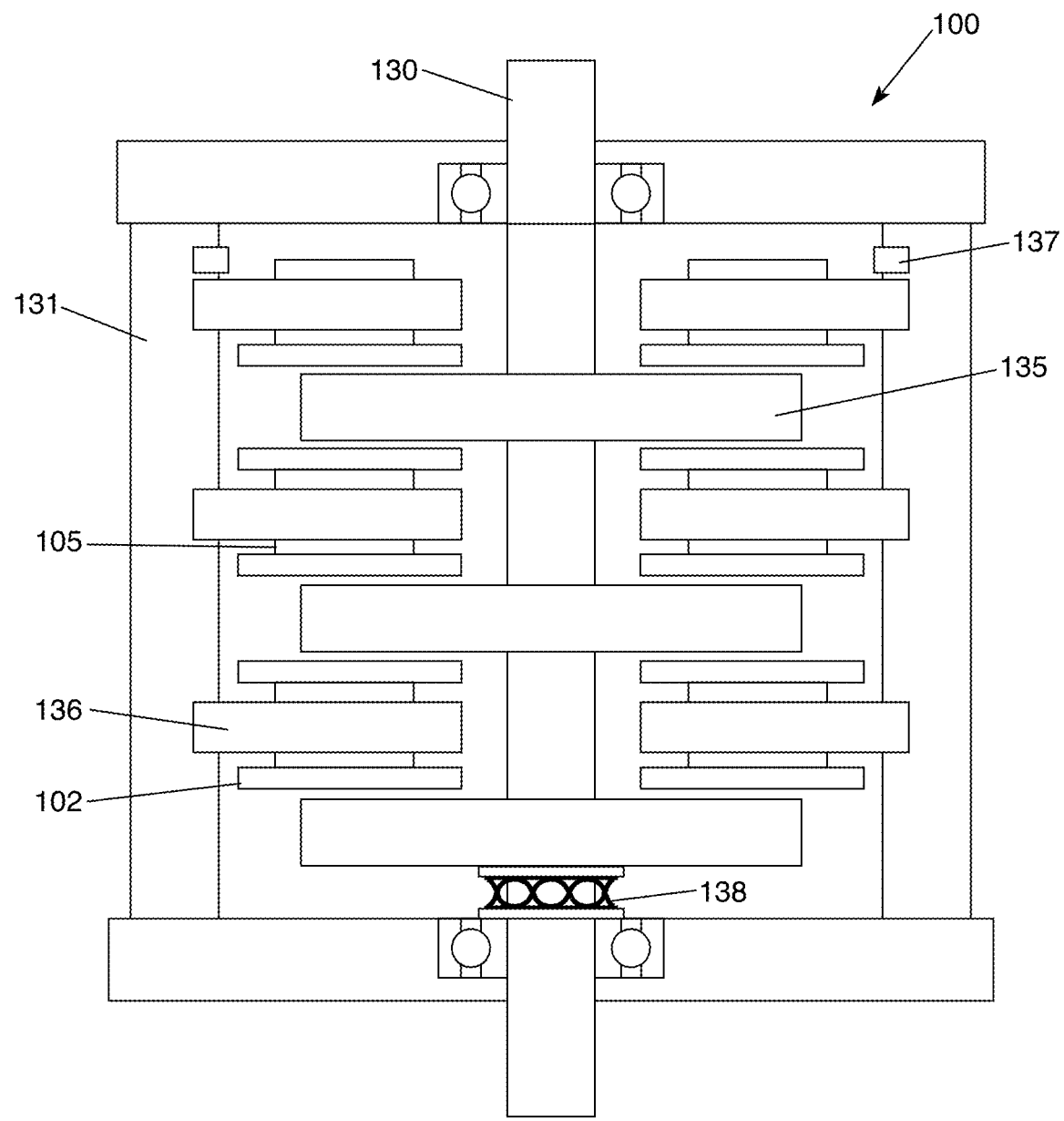
FIG. 14 is a rotary clutch with multiple stacked clutch pairs with inner and outer frames on ends.

FIG. 14 shows a stacked style clutch 100 in which the outermost clutch frames 136 are an outer on top and an inner frame 135 on the bottom. Compression between the frames 135/136 is maintained via a wave washer 138 that rests on the inner race of the bottom bearing. The top of the stack is supported by an internal retaining ring 137 located in a groove in the housing 131. The shaft 130 is constrained by a retaining ring 137 that rests on the inner race of the top bearing.

Figure 15:
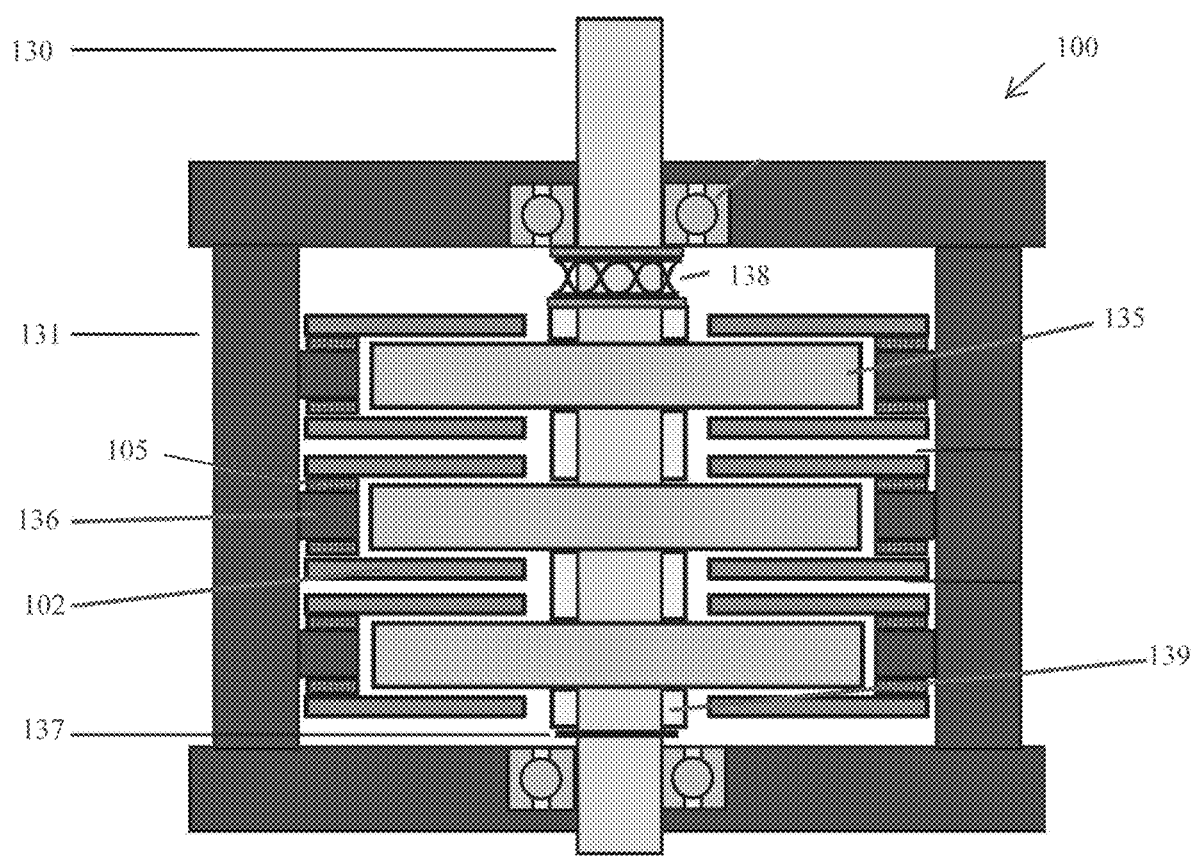
FIG. 15 is a rotary clutch with multiple nested clutch pairs acting in parallel.

FIG. 15 shows a nested style clutch 100 in which the outer frames 136 are ring shaped and the inner frames 135 are enclosed within this ring 136 by the outer frame's electrodes 102. In this illustration spacers 139 are placed between the nested frames 135/136 to manage spacing between the nested frames 135/136, but spacers 139 are not always necessary for this design. Alignment is managed by a wave washer 138 that rests on the inner race of the bearing. The bottom of the stack of clutch plates 102 rests on the retaining ring 137, which in turn rests on the other bearing. Again, the wave washer 138 and retaining ring 137 are not always necessary for this design because of the semi-independent nature of the nested clutch plate pairs 102.

By way of further detail, the clutches shown in FIGS. 13, 14 and 15 may be modified in a number of ways including but not limited to the following: Any number of clutch frames 135/136 may be added or removed to achieve the desired torque capability, any retaining ring 137 may be replaced by a step, shoulder, or other mechanical restraint, ball bearings may be replaced by plane bearings, bushings, air bearings, or absent altogether, the housing 131 and hubs may be explicit components, or they may be features of a larger housing 131 that serves multiple functions in a greater product such as a robot.

Figure 16A:
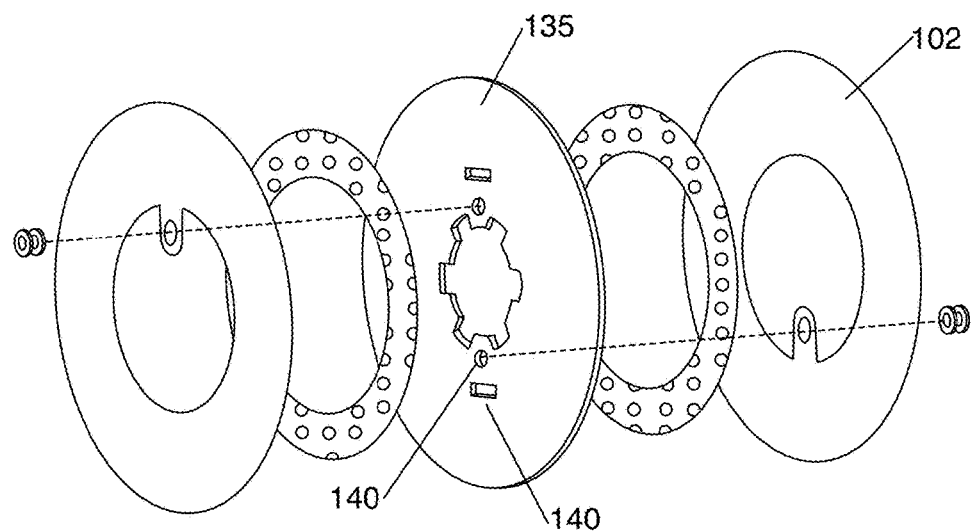
FIGS. 16A-16B show a frame aperture that allows passage of an electrode from one side to the other.
Figure 16B:
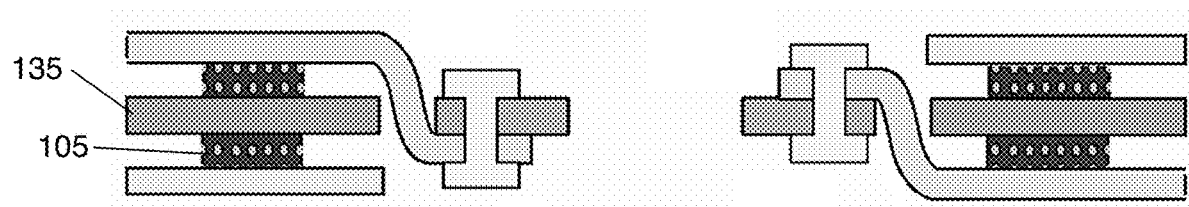

FIG. 16A shows the exploded view of a configuration for an inner frame 135. The rigid frame 135 includes teeth for interacting with a splined shaft 130, and four apertures 140. The circular apertures 140 are for inserting swages that can be used to clamp the flexible electrode 102 to the frame to establish electrical connections. The rectangular apertures 140 are for passing the electrode tails through to the opposite side of the frame 135. This can be advantageous for avoiding electrical contact between inner 135 and outer frames 136 or for simplifying electrical connections. The flexible electrode 102 is then mechanically connected to the frame 135 via patterned adhesive. FIG. 16B shows the same configuration from a cross-section view to better demonstrate the passing of the electrode tails through the aperture 140. One, two or multiple tail passings may be used on a single frame 135.

Figure 17A:
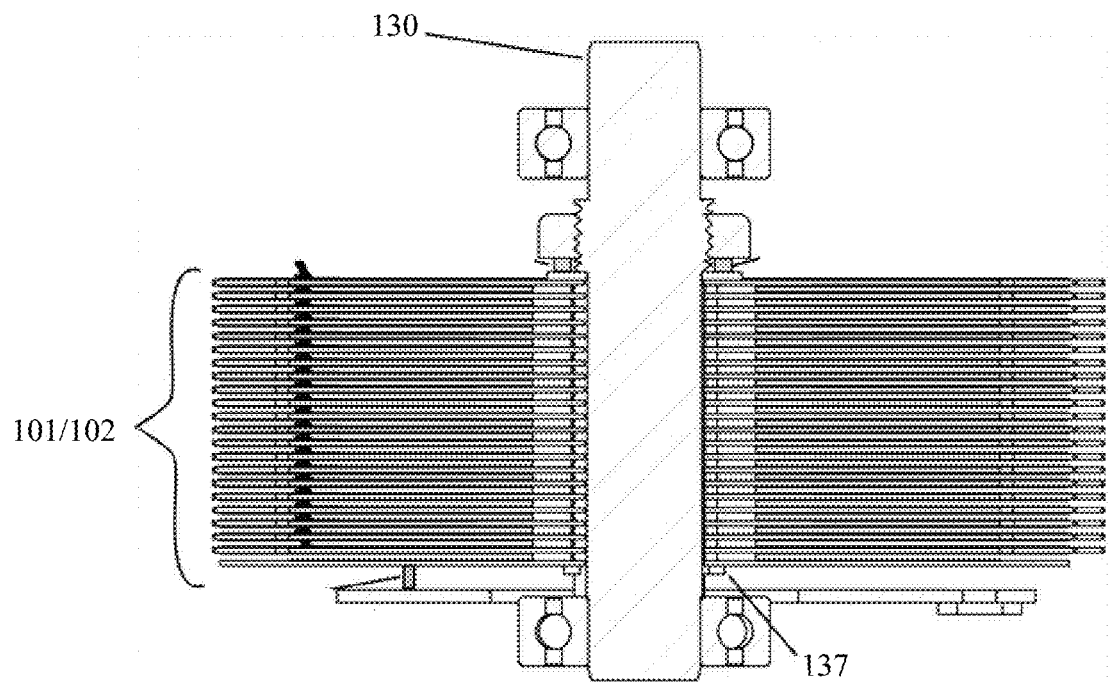
FIGS. 17A-17B demonstrate two different methods of tensioning the frame stack.
Figure 17B:
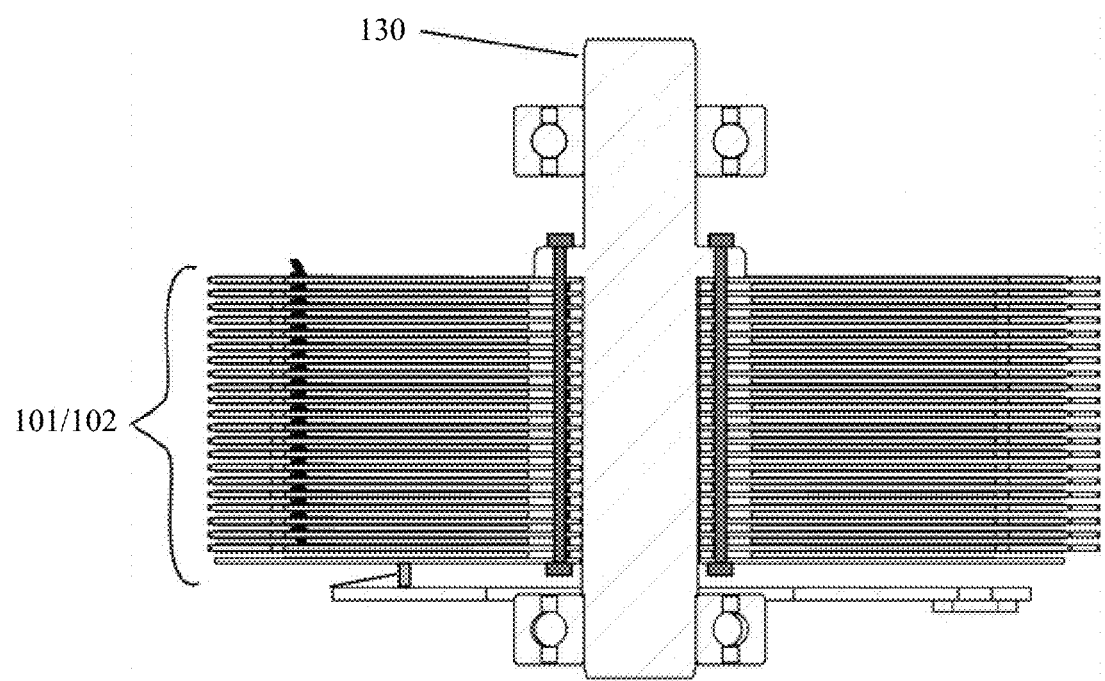

FIGS. 17A-17B show two methods for establishing compression along the clutch stack. In FIG. 17A, the shaft 130 is threaded and a nut is placed on the threads and tightened to press the stack up against a retaining ring. A washer may or may not be placed on the retaining ring to better distribute the load. In the second configuration shown in FIG. 17B, a shoulder is included on the shaft 130 and fasteners such as rivets or bolts are passed through the clutch stack 100 and fastened to the shoulder of the shaft 130. Note, the clutch stack 100 may also be compressed in this way without including the clutch shaft 130. This creates a cassette of frames that can be inserted into the housing 131 or onto the shaft 130 as a collection rather than one at a time. Any combinations of fasteners, shoulders, retaining rings and grooves may be used to achieve the desired effect of compressing the frames 135/136 and maintaining position of the frames 135/136 relative to the shaft 130 axially.

Figure 18A:
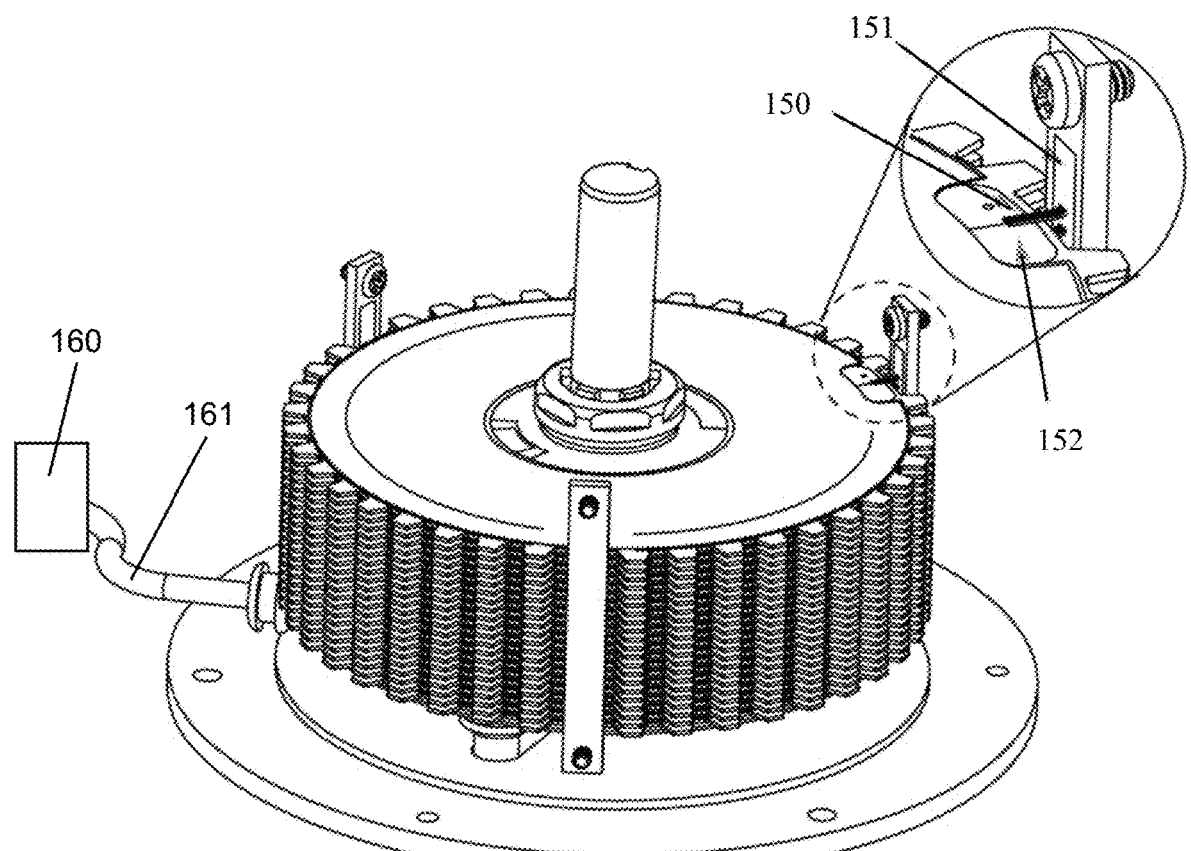
FIGS. 18A-18C depict electrical connections for the electrodes.
Figure 18B:
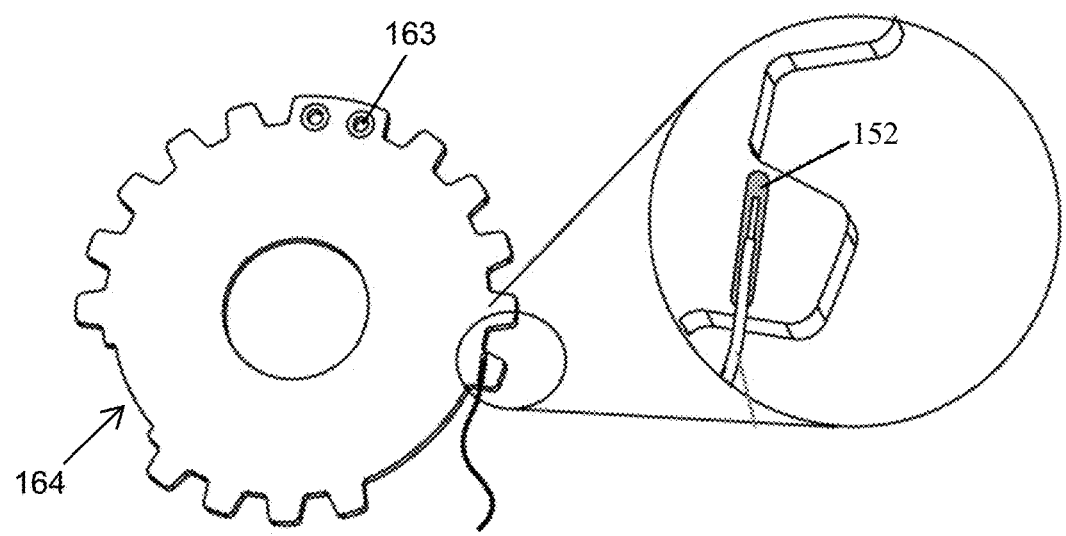
Figure 18C:
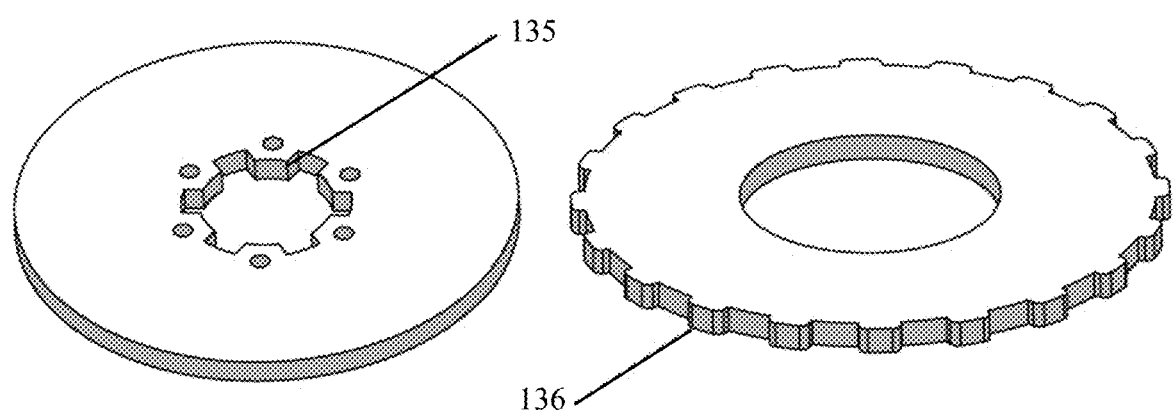

FIGS. 18A-18C demonstrate three methods of establishing electrical connection to the clutch plates from the voltage supply. FIG. 18A shows the clutch 100 with the housing hidden to demonstrate a configuration in which a spring finger 150 connects outer frames 136 to a command rail 151 mounted to the housing. FIG. 18B shows an embodiment in which a wire is connected to the outer frames 136 through a solder pad or surface connector 152. Teeth may or may not be selectively omitted from the frame 136 to allow space for the wired connection. FIG. 18C shows an embodiment where the conductive nature of the frame 135/136 itself is utilized. There are no electrical connectors added to the frames 135/136. Electrical connection is made between the inner clutch frame 135 to the shaft 130 via mechanical contact. Depending on the clutch 100 configuration, the top and bottom surfaces of the clutch frame 135 may or may not be conductive themselves or they may be coated with a dielectric material 101. In a similar nature, the outer frames 136 may establish connection to electrically active housing 131 teeth.

Figure 19A:
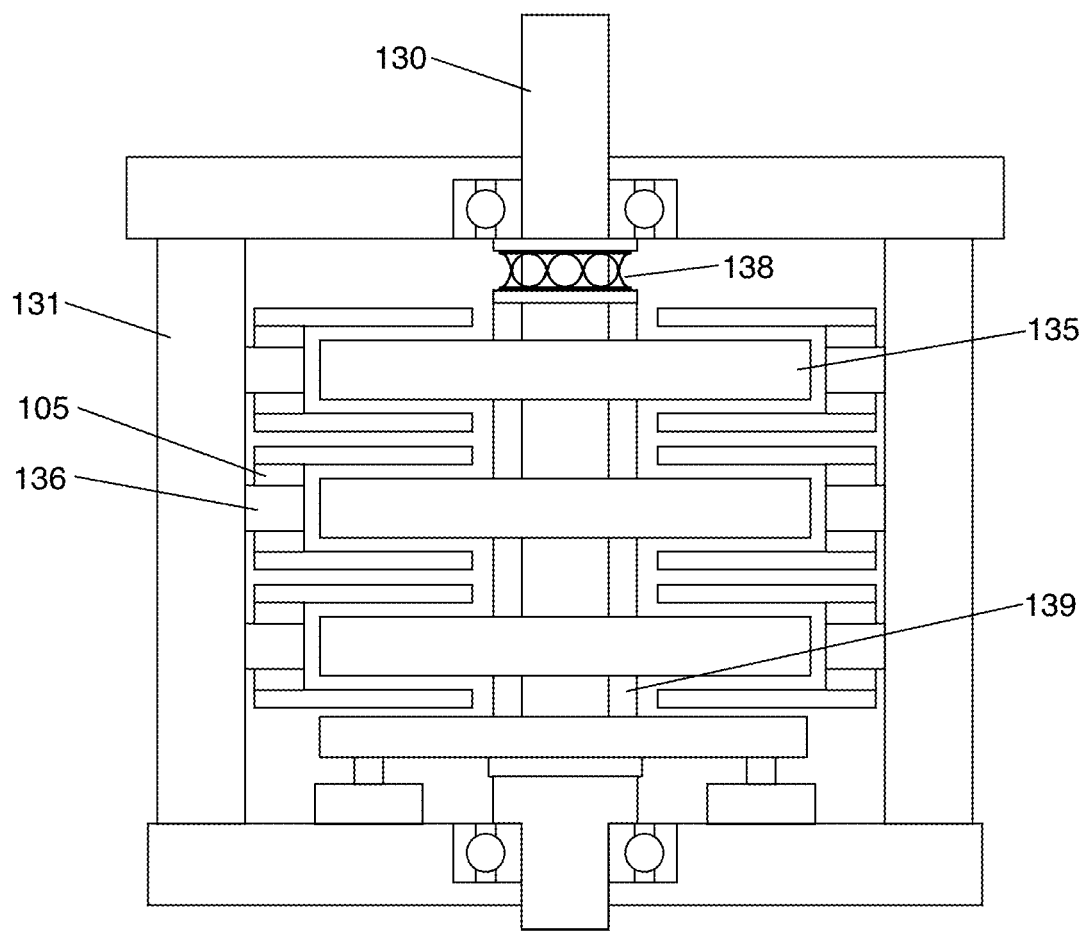
FIGS. 19A-19B are examples of rotary clutch configurations.
Figure 19B:
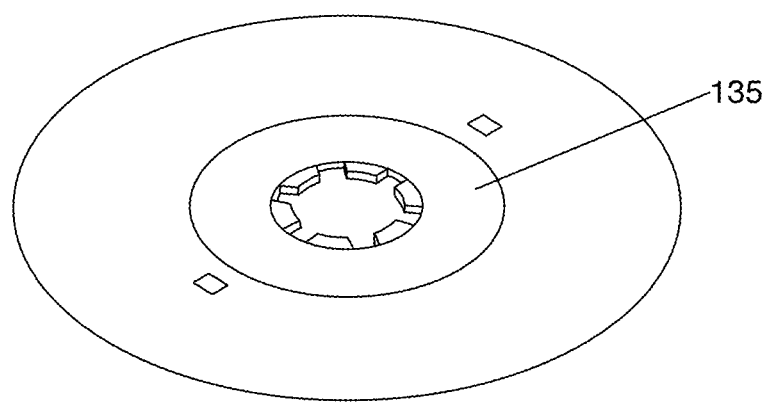

FIG. 19A is a crossectional view of an example clutch 100 configuration. The inner frames 135 are connected electrically via conductive spacers 139 or spring fingers 150. The stack of inner frames 135 and spacers 139 is electrically connected to the voltage supply via a slip ring in which there is a rotating disk with slip ring brushes or spring fingers 150 attached. These brushes connect to a stationary portion of the slip ring that is mounted to the housing 131 via a sliding mechanical connection. FIG. 19B shows an example of an inner clutch frame 135 with a conductive surface on the top and bottom faces for the conductive spacers 139 to contact. The remaining surface may be conductive or coated with a dielectric material 101 depending on the configuration. By way of further detail, the spacer 139 may be insulated on the inner diameter to prevent electrical connection from being established to the shaft 130.

Figure 20:
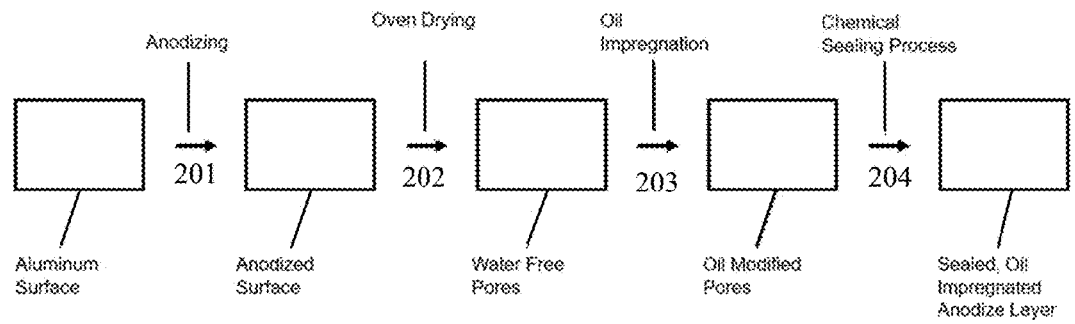
FIG. 20 is a flowchart showing a method of forming a ceramic dielectric layer.

FIG. 20 describes a flow chart for a sequence of potential modifications of an aluminum surface which is first anodized at step 201, then oven dried to remove pore bound water at step 202, further modified with a hydrophilic, hydrophobic or dielectric oil at step 203, and then finally sealed at step 204. The clutch 100 may be operative at any state of modification but lifetime, wear, leakage current or holding force can be improved by using combinations of these steps.

Figure 21:
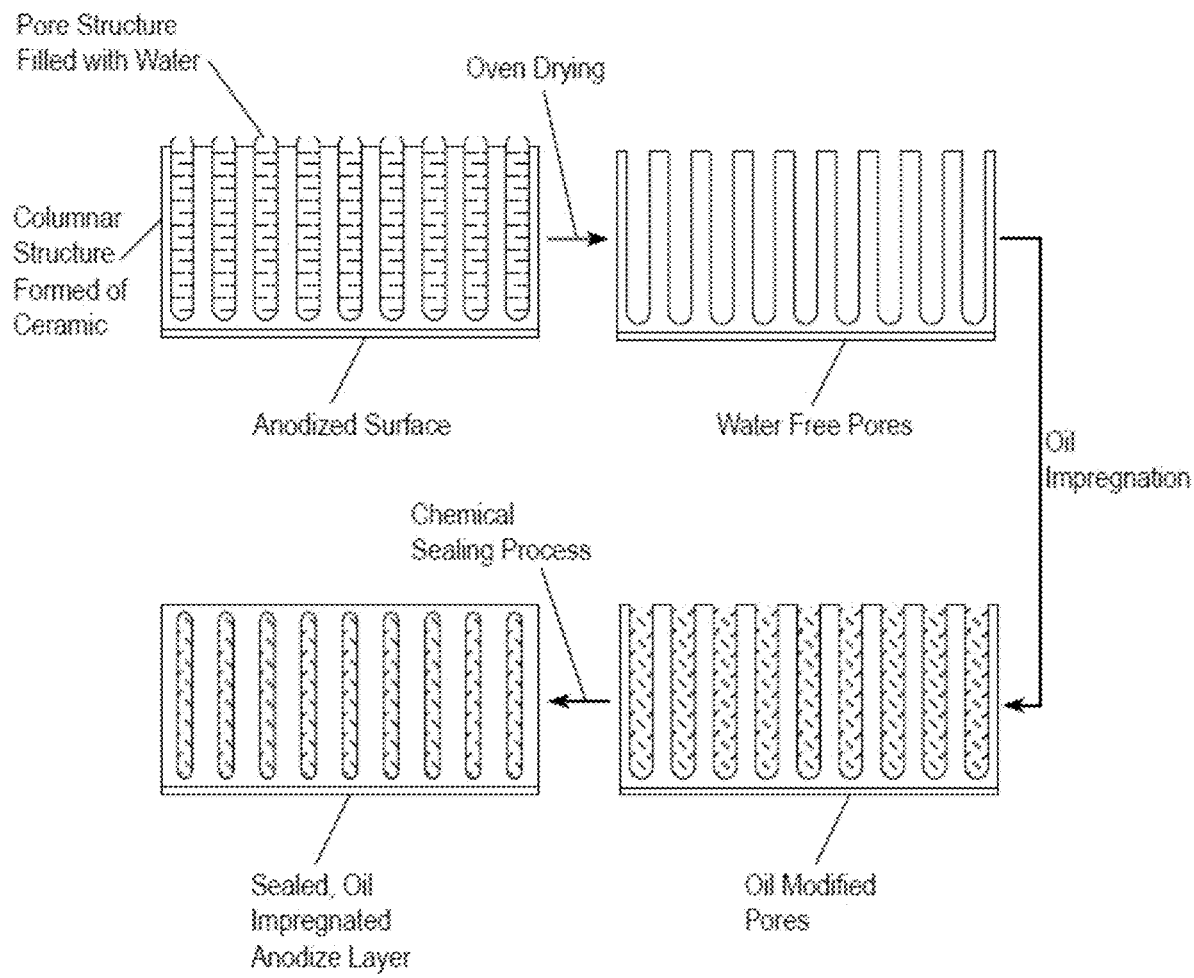
FIG. 21 is a graphical flowchart showing a method of treating the surface of a dielectric layer.

FIG. 21 shows schematics of the modifications described in the FIG. 20 flow chart as an illustration of the anodized pores being modified by drying, liquid impregnation, and sealing to encapsulate a liquid. The surface may be used effectively for the clutch 100 as any of these stages effectively but performance may be improved for different embodiments of the clutch 100 by one specific modification over another.

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure. Although certain example embodiments of the invention have been described, the scope of the appended claims is not intended to be limited solely to these embodiments. The claims are to be construed literally, purposively, and/or to encompass equivalents.

The invention claimed is:

1. A rotary electroadhesive clutch comprising:
   a first set of clutch members, wherein the first set of clutch members are electrically conductive;
   a second set of clutch members interposed between the first set of clutch members, wherein the second set of clutch members are electrically conductive; and
   a dielectric material separating each clutch member of the first set of clutch members from an adjacent member of the second set of clutch members,
   wherein at least one of the first set of clutch members and the second set of clutch members comprises a flexible film, membrane, or sheet, in which the flexible film, membrane, or sheet is selectively or uniformly attached to a structural frame using pressure sensitive adhesive, selective sintering, welding, rivets, swages, bolts, heat stakes, stitches, adhesives, or epoxies.

2. The rotary electroadhesive clutch of claim 1, wherein the clutch members are circular and are aligned parallel to one another along an axis.

3. The rotary electroadhesive clutch of claim 2, wherein the first set of clutch members and the second set of clutch members alternate along the axis such that each clutch member of the first set adheres to two members of the second set when a voltage is applied.

4. The rotary electroadhesive clutch of claim 3, wherein the first set of clutch members and the second set of clutch members are compressed in an axial direction.

5. The rotary electroadhesive clutch of claim 3, wherein the first set of clutch members and the second set of clutch members are compressed using a bolt, rivet, or a fastener.

6. The rotary electroadhesive clutch of claim 2, wherein each of the first set of clutch members adheres to two members from the second set, each of which is directly adjacent to the member from the first set.

7. The rotary electroadhesive clutch of claim 6, wherein alignment of the clutch pairs is achieved using at least one of a shoulder or retaining ring located on the housing or shaft.

8. The rotary electroadhesive clutch of claim 1, wherein the first set of clutch members is constrained in rotation relative to a housing, and the second set of clutch members is constrained in rotation relative to a shaft.

9. The rotary electroadhesive clutch of claim 8, wherein the second set of clutch members transmits torque to the shaft and the first set of clutch members transmits torque to the housing through mating features that fit through holes in the clutch members, connections, or friction surfaces.

10. The rotary electroadhesive clutch of claim 1, wherein the structural frame comprises a material selected from the group consisting of fiberglass, carbon fiber, plastic, wood, paper, resin, cast epoxy, ceramic, a friction material, metal, or any combination of the foregoing.

11. The rotary electroadhesive clutch of claim 10, further comprising:
   an electrical connection from the voltage source to the clutch member, wherein the electrical connection is integrated into the structural frame or positioned on a surface of the structural frame.

12. The rotary electroadhesive clutch of claim 1, further comprising:
   an electrical connection between the voltage source and the clutch members, wherein the electrical connection is transmitted through an electrically conductive housing and/or an electrically conductive shaft in mechanical contact with a conductive surface of the clutch members.

13. The rotary electroadhesive clutch of claim 1, further comprising:
   an electrical connection, wherein the electrical connection between the voltage source and the clutch members is transmitted through a rigid or flexible wire, ribbon cable, flat flex cable, printed circuit board, slip ring, conductive spacers, or similar electrical connection.

14. The rotary electroadhesive clutch of claim 1, further comprising:
   an electrical connection, wherein the electrical connection between the voltage source and the clutch members is transmitted through a conductive brush, spring finger, spring-loaded pin, conductive washer, ring shim, battery contact, conductive gasket, conductive clip, swage, eyelet, non-conductive clamp holding two conductive surfaces in contact, conductive pressure-sensitive adhesive, conductive epoxy, or soldering.

15. The rotary electroadhesive clutch of claim 1, further comprising:
   an electrical via, wherein the electrical via creates an electrical connection between a single insulating layer, multiple insulating layers, or physically separate electrically conductive surfaces.

16. A rotary electroadhesive clutch comprising:
   a first set of clutch members, wherein the first set of clutch members are electrically conductive;
   a second set of clutch members interposed between the first set of clutch members, wherein the second set of clutch members are electrically conductive;
   a dielectric material separating each clutch member of the first set of clutch members from an adjacent member of the second set of clutch members;
   a structural frame;
   an aperture in a perimeter of the structural frame; and
   an extension of the flexible film, wherein the extension passes from one side of the structural frame to the other through the aperture in order to enable an electrical connection to prevent contact between the electrically conductive portions of the first set of clutch members to electrically conductive portions of the second set of clutch members,
   wherein at least one of the first set of clutch members and the second set of clutch members comprises a flexible film, membrane, or sheet, in which the flexible film, membrane, or sheet is selectively or uniformly attached to the structural frame.

17. The rotary electroadhesive clutch of claim 16,
   wherein the electrical connection is integrated into the structural frame or positioned on a surface of the structural frame, and
   wherein the structural frame comprises a material selected from the group consisting of fiberglass, carbon fiber, plastic, wood, paper, resin, cast epoxy, ceramic, a friction material, metal, or any combination of the foregoing.

18. A rotary electroadhesive clutch comprising:
   a first set of clutch members, wherein the first set of clutch members are electrically conductive;

a second set of clutch members interposed between the first set of clutch members, wherein the second set of clutch members are electrically conductive;

a dielectric material separating each clutch member of the first set of clutch members from an adjacent member of the second set of clutch members;

a structural frame;

an opening, a slit, or an aperture in the structural frame; and an extension of the flexible film, wherein the extension passes from one side of the structural frame to the other in order to enable an electrical connection to prevent contact between the electrically conductive portions of the first set of clutch members to electrically conductive portions of the second set of clutch members, wherein at least one of the first set of clutch members and the second set of clutch members comprises a flexible film, membrane, or sheet, in which the flexible film, membrane, or sheet is selectively or uniformly attached to the structural frame.

19. The rotary electroadhesive clutch of claim 18, wherein the electrical connection is integrated into the structural frame or positioned on a surface of the structural frame, and wherein the structural frame comprises a material selected from the group consisting of fiberglass, carbon fiber, plastic, wood, paper, resin, cast epoxy, ceramic, a friction material, metal, or any combination of the foregoing.

* * * * *